United States Patent
Kim et al.

(10) Patent No.: US 8,014,248 B2
(45) Date of Patent: Sep. 6, 2011

(54) RECORDING MEDIUM WITH A LINKING AREA INCLUDING DUMMY DATA THEREON AND APPARATUS AND METHODS FOR FORMING, RECORDING, AND REPRODUCING THE RECORDING MEDIUM

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 12/385,913

(22) Filed: Apr. 23, 2009

(65) Prior Publication Data

US 2009/0207706 A1 Aug. 20, 2009

Related U.S. Application Data

(63) Continuation of application No. 10/753,401, filed on Jan. 9, 2004, now Pat. No. 7,525,889, which is a continuation-in-part of application No. PCT/KR03/01096, filed on Jun. 4, 2003.

(30) Foreign Application Priority Data

| Jun. 5, 2002 | (KR) | 2002-037146 |
| Nov. 4, 2002 | (KR) | 2002-067955 |
| Nov. 4, 2002 | (KR) | 2002-067956 |
| Dec. 5, 2002 | (KR) | 2002-077093 |
| Dec. 5, 2002 | (KR) | 2002-077094 |
| Dec. 13, 2002 | (KR) | 2002-079818 |
| Dec. 13, 2002 | (KR) | 2002-079819 |
| Jan. 11, 2003 | (KR) | 2003-001858 |

(51) Int. Cl.
*G11B 7/00* (2006.01)
*G11B 7/24* (2006.01)

(52) U.S. Cl. .................. 369/53.24; 369/275.1
(58) Field of Classification Search .................. None
See application file for complete search history.

(56) References Cited

U.S. PATENT DOCUMENTS

| 4,419,750 A | 12/1983 | Howe |
| 4,792,917 A | 12/1988 | Takamatsu et al. |
| 4,907,215 A | 3/1990 | Sako et al. |
| 5,216,656 A | 6/1993 | Sako et al. |
| 5,224,087 A | 6/1993 | Maeda et al. |
| 5,244,705 A | 9/1993 | Tsurushima et al. |
| 5,313,340 A | 5/1994 | Takayama et al. |

(Continued)

FOREIGN PATENT DOCUMENTS

CN 1047179 11/1990

(Continued)

OTHER PUBLICATIONS

European Search Report dated Jan. 18, 2010f for corresponding European Application No. 03730892.1.

(Continued)

*Primary Examiner* — Daniell L Negrón
*Assistant Examiner* — Parul Gupta
(74) *Attorney, Agent, or Firm* — Harness, Dickey & Pierce, P.L.C.

(57) ABSTRACT

A recording medium, such as a high-density and/or read-only recording medium including a data area including at least two data sections and a linking area to link neighboring data sections, the linking area including dummy data, and to methods and apparatuses for forming, recording, and reproducing the recording medium.

27 Claims, 22 Drawing Sheets

U.S. PATENT DOCUMENTS

| | | |
|---|---|---|
| 5,414,686 A | 5/1995 | Iitsuka |
| 5,506,823 A | 4/1996 | Sanada |
| 5,563,861 A | 10/1996 | Kudo et al. |
| 5,570,339 A | 10/1996 | Nagano |
| 5,587,978 A | 12/1996 | Endo et al. |
| 5,644,507 A | 7/1997 | Ostrover et al. |
| 5,650,991 A | 7/1997 | Fujiie |
| 5,656,348 A | 8/1997 | Kudo et al. |
| 5,689,488 A | 11/1997 | Yamaguchi |
| 5,708,649 A | 1/1998 | Kamoto et al. |
| 5,729,516 A | 3/1998 | Tozaki et al. |
| 5,732,066 A | 3/1998 | Moriya et al. |
| 5,886,985 A | 3/1999 | Kobayashi et al. |
| 5,901,127 A | 5/1999 | Sako et al. |
| 5,915,263 A | 6/1999 | Maeda |
| 5,920,578 A | 7/1999 | Zook |
| 5,940,255 A | 8/1999 | Uwabo et al. |
| 5,953,187 A | 9/1999 | Uwabo et al. |
| 5,978,336 A | 11/1999 | Mine et al. |
| 6,067,281 A | 5/2000 | Kobayashi et al. |
| 6,088,307 A | 7/2000 | Fushimi et al. |
| 6,115,340 A | 9/2000 | Van Den Enden et al. |
| 6,118,741 A | 9/2000 | Mimnagh et al. |
| 6,122,245 A | 9/2000 | Kondo et al. |
| 6,134,626 A | 10/2000 | Inokuchi et al. |
| 6,137,763 A | 10/2000 | Dahan et al. |
| 6,157,606 A | 12/2000 | Inazawa et al. |
| 6,182,240 B1 | 1/2001 | Mine |
| 6,191,903 B1 | 2/2001 | Fujimoto et al. |
| 6,205,104 B1 | 3/2001 | Nagashima et al. |
| 6,246,537 B1 | 6/2001 | Shirane |
| 6,256,282 B1 | 7/2001 | Yamagami et al. |
| 6,330,392 B1 | 12/2001 | Nakatani et al. |
| 6,343,062 B1 | 1/2002 | Furukawa et al. |
| 6,392,968 B1 | 5/2002 | Kageyama et al. |
| 6,442,128 B1 | 8/2002 | Lee et al. |
| 6,452,897 B1 | 9/2002 | Van Den Enden |
| 6,459,661 B1 | 10/2002 | Iwanaga |
| 6,477,123 B1 | 11/2002 | Hütter |
| 6,628,584 B1 | 9/2003 | Heemskerk et al. |
| 6,667,939 B1 | 12/2003 | Miyamoto |
| 6,724,707 B2 | 4/2004 | Woudenberg et al. |
| 6,735,155 B2 * | 5/2004 | Kuroda et al. ............ 369/47.27 |
| 6,762,984 B1 | 7/2004 | Sasaki et al. |
| 6,788,609 B2 | 9/2004 | Yamagami et al. |
| 6,788,630 B1 | 9/2004 | Lee et al. |
| 6,879,637 B1 | 4/2005 | Nakagawa et al. |
| 6,971,024 B1 | 11/2005 | Sako et al. |
| 7,065,030 B2 | 6/2006 | Tachino et al. |
| 7,266,753 B2 | 9/2007 | Tomita |
| 2001/0026510 A1 | 10/2001 | Kuroda et al. |
| 2001/0026511 A1 * | 10/2001 | Ueda et al. ................ 369/47.14 |
| 2002/0027990 A1 | 3/2002 | Sako et al. |
| 2002/0044510 A1 | 4/2002 | Stan et al. |
| 2002/0051631 A1 | 5/2002 | Okamoto et al. |
| 2002/0064277 A1 | 5/2002 | Kuribayashi et al. |
| 2002/0067679 A1 | 6/2002 | Eom et al. |
| 2002/0071655 A1 | 6/2002 | Kanota et al. |
| 2002/0097648 A1 | 7/2002 | Ilda |
| 2003/0012099 A1 | 1/2003 | Sako et al. |
| 2003/0048722 A1 | 3/2003 | Ando et al. |
| 2003/0169878 A1 | 9/2003 | Miles |
| 2004/0010468 A1 | 1/2004 | Abe et al. |
| 2004/0030983 A1 | 2/2004 | Tomita |
| 2004/0165504 A1 | 8/2004 | Kobayashi |
| 2005/0213483 A1 | 9/2005 | Tomita et al. |
| 2006/0023601 A1 | 2/2006 | Tachino et al. |
| 2006/0156205 A1 | 7/2006 | Tomita |

FOREIGN PATENT DOCUMENTS

| | | |
|---|---|---|
| CN | 1135632 A | 11/1996 |
| CN | 1140875 | 1/1997 |
| CN | 1054933 | 7/2000 |
| CN | 1340189 | 3/2002 |
| EP | 0 715 301 A2 | 6/1996 |
| EP | 0 837 471 | 4/1998 |
| EP | 0 893 794 A2 | 1/1999 |
| EP | 0 987 687 A2 | 3/2000 |
| EP | 1014717 | 6/2000 |
| EP | 1 022 735 | 7/2000 |
| EP | 1 033 703 A2 | 9/2000 |
| EP | 1 045 391 | 10/2000 |
| EP | 1 052 639 | 11/2000 |
| EP | 1 291 871 | 3/2003 |
| JP | 62-274948 | 11/1987 |
| JP | 63-161569 | 7/1988 |
| JP | 05-040663 | 2/1993 |
| JP | 05-054518 | 3/1993 |
| JP | 05-314731 | 11/1993 |
| JP | 09-055731 | 2/1997 |
| JP | 09-073414 | 3/1997 |
| JP | 09-106549 | 4/1997 |
| JP | 9-106549 | 4/1997 |
| JP | 09-106625 | 4/1997 |
| JP | 09-128907 | 5/1997 |
| JP | 09-231567 | 9/1997 |
| JP | 10-112166 | 4/1998 |
| JP | 11-045508 | 2/1999 |
| JP | 11-238305 | 8/1999 |
| JP | 11-296996 | 10/1999 |
| JP | 11-513167 | 11/1999 |
| JP | 2000-082219 | 3/2000 |
| JP | 2000-099952 | 4/2000 |
| JP | 2000-113589 | 4/2000 |
| JP | 2000-137952 | 5/2000 |
| JP | 2000-148569 | 5/2000 |
| JP | 2000-163749 | 6/2000 |
| JP | 2000-195049 | 7/2000 |
| JP | 2000-215607 | 8/2000 |
| JP | 2000-331412 | 11/2000 |
| JP | 2001-052338 | 2/2001 |
| JP | 2001-126456 | 5/2001 |
| JP | 2001-184787 | 7/2001 |
| JP | 2001-306622 | 11/2001 |
| JP | 2002-050131 | 2/2002 |
| JP | 2002-050136 | 2/2002 |
| JP | 2002-092873 | 3/2002 |
| JP | 2002-260339 | 9/2002 |
| JP | 2002-260341 | 9/2002 |
| JP | 2003-085892 | 3/2003 |
| JP | 2005-519421 | 6/2005 |
| KR | 930005438 | 6/1993 |
| KR | 1998-703803 | 12/1998 |
| KR | 10-2000-0015225 | 3/2000 |
| KR | 10-2000-0068204 | 11/2000 |
| KR | 10-0294881 | 4/2001 |
| KR | 10-2002-0039112 | 5/2002 |
| RU | 2 032 233 | 3/1995 |
| TW | 391549 | 5/2000 |
| TW | 411452 | 11/2000 |
| TW | 417099 | 1/2001 |
| TW | 451188 | 8/2001 |
| TW | 451191 | 8/2001 |
| UA | 72907 | 10/2001 |
| WO | WO 00/08637 A1 | 2/2000 |
| WO | WO 00/31737 | 6/2000 |
| WO | WO 00/34952 | 6/2000 |
| WO | WO 01/15168 | 3/2001 |
| WO | WO 01/29832 | 4/2001 |
| WO | WO 01/29832 A1 | 4/2001 |
| WO | WO 01/48755 | 7/2001 |
| WO | WO 01/93262 A2 | 12/2001 |
| WO | WO 02/103530 | 12/2002 |
| WO | WO 03/077246 A2 | 9/2003 |

OTHER PUBLICATIONS

European Search Report dated Jan. 18, 2010 for corresponding European Application No. 07017107.9.

European Search Report dated Mar. 11, 2010 for corresponding Application No. 05012457.7.

Japanese Office Action for corresponding Application No. JP 2005-184826 dated Mar. 23, 2010.

Japanese Office Action for corresponding Application No. JP 2005-184846 dated Mar. 23, 2010.

Office Action issued Feb. 10, 2006 by the Chinese Patent Office in counterpart Chinese Patent Application No. 03800943.9 (with English language translation).
Supplemental Search Report issued Sep. 23, 2005 by the European Patent Office in counterpart European Patent Application No. 03757210.4-2210.
Office Action issued Jun. 12, 2007 by the Japanese Patent Office in counterpart Japanese Patent Application No. 2004-512129.
Office Action issued Nov. 14, 2006 by the Japanese Patent Office in counterpart Japanese Patent Application No. 2004-512129.
Office Action issued Jul. 31, 2008 by the Korean Patent Office in counterpart Korean Patent Application No. 10-2002-0031744.
Office Action issued Apr. 30, 2008 by the U.S. Patent and Trademark Office in counterpart U.S. Appl. No. 10/485,912.
Office Action issued Oct. 12, 2007 by the U.S. Patent and Trademark Office in counterpart U.S. Appl. No. 10/485,912.
Office Action issued Sep. 22, 2006 by the U.S. Patent and Trademark Office in counterpart U.S. Appl. No. 10/485,912.
International Search Report issued Sep. 24, 2003 in counterpart International Patent Application No. PCT/KR03/01109.
Office Action issued Sep. 16, 2008 by the Japanese Patent Office in Japanese Patent Application No. 2005-184834.
Office Action for corresponding Korean Application No. 10-2002-0031745 dated Jul. 31, 2008.
Office Action for corresponding Korean Application No. 10-2002-0031746 dated Jul. 31, 2008.
PCT Search Report dated Aug. 28, 2003.
PCT Search Report dated Sep. 29, 2003.
Korean Search Report dated Jul. 30, 2004.
US Office Action dated Oct. 6, 2004.
European Search Report dated Dec. 28, 2004.
Korean Search Report dated Jan. 28, 2005.
Korean Search Report dated Mar. 28, 2005.
Chinese Office Action dated Sep. 30, 2005 and English translation.
US Office Action dated Nov. 2, 2005.
Chinese Office Action dated Feb. 10, 2006 and English translation.
Russian Search Report dated Feb. 22, 2006 and English translation.
US Office Action dated May 5, 2006.
US Office Action dated Sep. 7, 2006.
US Office Action dated Jan. 4, 2007.
Taiwan Search Report dated Apr. 16, 2007.
Taiwan Search Report dated Jun. 12, 2007.
US Office Action dated Jun. 13, 2007.
US Office Action dated Sep. 10, 2007.
US Office Action dated Sep. 28, 2007.
Chinese Office Action dated Sep. 21, 2007 and English translation.
US Office Action dated Nov. 16, 2007.
Japanese Search Report Mar. 18, 2008.
Taiwan Official Letter for Taiwan Patent Application No. 94125650 dated Jun. 12, 2007 and English language translation.
English translation of Examination Report related to Russian Application No. 2004124954 dated Feb. 22, 2006.
UA Application No. 72907 (English language abstract only).
Office Action issued May 27, 2009 by the European Patent Office in European App. No. 04015555.8-1247.
Office Action issued Jun. 30, 2009 by the Japanese Patent Office in Japanese App. No. 2004-512131.
Office Action issued Jul. 14, 2009 by the Japanese Patent Office in Japanese App. No. 2005-184826.
Office Action issued Jun. 11, 2009 by the Russian Patent Office in Russian App. No. 2005117716/28.
Search Report issued Aug. 8, 2009 by Taiwan Patent Office in Application No. TW 092115327.
Search Report issued Aug. 8, 2009 by Taiwan Patent Office in Application No. TW 094125642.
Search Report issued Aug. 8, 2009 by Taiwan Patent Office in Application No. TW 094125644.
Search Report issued Aug. 8, 2009 by Taiwan Patent Office in Application No. TW 094125646.
Office Action for Korean patent application No. 10-2002-0067956 dated Oct. 28, 2009.
Japanese Office Action dated Nov. 4, 2009.
European Search Report dated Nov. 2, 2009.

* cited by examiner

*Single written Recording Unit Block (RUB)*

*Continuously written sequence of Recording Unit Blocks*

FIG. 1D

| Run-In | Physical Cluster | Run-Out | Run-In |
|---|---|---|---|
| 2760 Channel Bit | 958272 Channel Bit (Recodring Frames #0 - #30) | 1104 Channel Bit | 2760 Channel Bit |

| Frame Number | Frame Sync | Frame Number | Frame Sync |
|---|---|---|---|
| Frame #0 | FS 0 | Frame #16 | FS 5 |
| Frame #1 | FS 1 | Frame #17 | FS 3 |
| Frame #2 | FS 2 | Frame #18 | FS 2 |
| Frame #3 | FS 3 | Frame #19 | FS 2 |
| Frame #4 | FS 3 | Frame #20 | FS 5 |
| Frame #5 | FS 1 | Frame #21 | FS 6 |
| Frame #6 | FS 4 | Frame #22 | FS 5 |
| Frame #7 | FS 1 | Frame #23 | FS 1 |
| Frame #8 | FS 5 | Frame #24 | FS 1 |
| Frame #9 | FS 5 | Frame #25 | FS 6 |
| Frame #10 | FS 4 | Frame #26 | FS 2 |
| Frame #11 | FS 3 | Frame #27 | FS 6 |
| Frame #12 | FS 4 | Frame #28 | FS 4 |
| Frame #13 | FS 6 | Frame #29 | FS 4 |
| Frame #14 | FS 6 | Frame #30 | FS 2 |
| Frame #15 | FS 3 | | |

FIG. 1E

| Sync Number | 24-bit sync body | 6-bit sync ID |
|---|---|---|
| FS 0 | 01 010 000 000 010 000 000 010 | 000 001 |
| FS 1 | 01 010 000 000 010 000 000 010 | 010 010 |
| FS 2 | 01 010 000 000 010 000 000 010 | 101 000 |
| FS 3 | 01 010 000 000 010 000 000 010 | 100 001 |
| FS 4 | 01 010 000 000 010 000 000 010 | 000 100 |
| FS 5 | 01 010 000 000 010 000 000 010 | 001 001 |
| FS 6 | 01 010 000 000 010 000 000 010 | 010 000 |

| FS n (new) | 01 010 000 000 010 000 000 010 | FS 7 : 100 101<br>FS 8 : 101 010<br>FS 9 : 010 101<br>FS 10: 101 001 |

|  | Case 1 | Case 2 | Case 3 | Case 4 |
|---|---|---|---|---|
| FS #1 | FS0 | FS0 | FS7, 8, or 9 | FS10 |
| FS #2 | FS7 | FS10 | FS7, 8, or 9 | FS10 |

FIG. 7A

Sync 1 : FS0, Sync 2 : FS7

| Frame n | Frame n-1 | Frame n-2 | Frame n-3 | Frame Number |
|---------|-----------|-----------|-----------|--------------|
| FS0 | FS7 | FS0 | FS2 | 0 |
| FS0 | FS2 | FS4 | FS4 | 0 |
| FS0 | FS2 | FS4 | FS4 | 31 |
| FS1 | FS0 | FS7/FS2 | FS0/FS4 | 1 |
| FS1 | FS3 | FS3 | FS2 | 5 |
| FS1 | FS4 | FS1 | FS3 | 7 |
| FS1 | FS5 | FS6 | FS5 | 23 |
| FS1 | FS1 | FS5 | FS6 | 24 |
| FS2 | FS1 | FS0 | FS7/FS2 | 2 |
| FS2 | FS3 | FS5 | FS3 | 18 |
| FS2 | FS2 | FS3 | FS5 | 19 |
| FS2 | FS6 | FS1 | FS1 | 26 |
| FS2 | FS4 | FS4 | FS6 | 30 |
| FS3 | FS2 | FS1 | FS0 | 3 |
| FS3 | FS3 | FS2 | FS1 | 4 |
| FS3 | FS4 | FS5 | FS5 | 11 |
| FS3 | FS6 | FS6 | FS4 | 15 |
| FS3 | FS5 | FS3 | FS6 | 17 |
| FS4 | FS1 | FS3 | FS3 | 6 |
| FS4 | FS5 | FS5 | FS1 | 10 |
| FS4 | FS3 | FS4 | FS5 | 12 |
| FS4 | FS6 | FS2 | FS6 | 28 |
| FS4 | FS5 | FS3 | FS6 | 29 |
| FS5 | FS1 | FS4 | FS1 | 8 |
| FS5 | FS5 | FS1 | FS4 | 9 |
| FS5 | FS3 | FS6 | FS6 | 26 |
| FS5 | FS2 | FS2 | FS3 | 20 |
| FS5 | FS6 | FS5 | FS2 | 22 |
| FS6 | FS4 | FS3 | FS4 | 13 |
| FS6 | FS6 | FS4 | FS3 | 14 |
| FS6 | FS5 | FS2 | FS2 | 21 |
| FS6 | FS1 | FS1 | FS5 | 25 |
| FS6 | FS2 | FS6 | FS1 | 27 |
| FS7 | FS0 | 2 | FS4 | 32 |

(1) : Frame Number 0 for the 1st AUN(Address Unit) of RUB
(2) : Frame Number 0 for the the Middle AUN(Address Unit) of RUB
(3) : Frame Number 1 (1st AUN(Address Unit) of RUB / Middle AUN(Address Unit) of RUB)
(4) : Frame Number 2 (1st AUN(Address Unit of RUB / Middle AUN(Address Unit) of RUB)

FIG. 7B

Sync 1 : FS7, Sync 2 : FS7

| Frame n | Frame n-1 | Frame n-2 | Frame n-3 | Frame Number |
|---|---|---|---|---|
| FS0 | FS7/FS2 | FS7/FS4 | FS2/FS4 | 0 | → (1)
| FS1 | FS0 | FS7/FS2 | FS7/FS4 | 1 | → (2)
| FS1 | FS3 | FS3 | FS2 | 5 |
| FS1 | FS4 | FS1 | FS3 | 7 |
| FS1 | FS5 | FS6 | FS5 | 23 |
| FS1 | FS1 | FS5 | FS6 | 24 |
| FS2 | FS1 | FS0 | FS7/FS2 | 2 | → (3)
| FS2 | FS3 | FS5 | FS3 | 18 |
| FS2 | FS2 | FS3 | FS5 | 19 |
| FS2 | FS6 | FS1 | FS1 | 26 |
| FS2 | FS4 | FS4 | FS6 | 30 |
| FS3 | FS2 | FS1 | FS0 | 3 |
| FS3 | FS3 | FS2 | FS1 | 4 |
| FS3 | FS4 | FS5 | FS5 | 11 |
| FS3 | FS6 | FS6 | FS4 | 15 |
| FS3 | FS5 | FS3 | FS6 | 17 |
| FS4 | FS1 | FS3 | FS3 | 6 |
| FS4 | FS5 | FS5 | FS1 | 10 |
| FS4 | FS3 | FS4 | FS5 | 12 |
| FS4 | FS6 | FS2 | FS6 | 28 |
| FS4 | FS5 | FS3 | FS6 | 29 |
| FS5 | FS1 | FS4 | FS1 | 8 |
| FS5 | FS5 | FS1 | FS4 | 9 |
| FS5 | FS3 | FS6 | FS6 | 26 |
| FS5 | FS2 | FS2 | FS3 | 20 |
| FS5 | FS6 | FS5 | FS2 | 22 |
| FS6 | FS4 | FS3 | FS4 | 13 |
| FS6 | FS6 | FS4 | FS3 | 14 |
| FS6 | FS5 | FS2 | FS2 | 21 |
| FS6 | FS1 | FS1 | FS5 | 25 |
| FS6 | FS2 | FS6 | FS1 | 27 |
| FS7 | FS2 | FS4 | FS4 | 31 |
| FS7 | FS7 | FS2 | FS4 | 32 |

(1): Frame Number 0 (1st AUN(Address Unit) of RUB / Middle AUN(Address Unit) of RUB)
(2): Frame Number 1 (1st AUN(Address Unit) of RUB / Middle AUN(Address Unit) of RUB)
(3): Frame Number 2 (1st AUN(Address Unit) of RUB / Middle AUN(Address Unit) of RUB)

FIG. 7C

Sync 1 : FS7, Sync 2 : FS8

| Frame n | Frame n-1 | Frame n-2 | Frame n-3 | Frame Number | |
|---|---|---|---|---|---|
| FS0 | FS8/FS2 | FS7/FS4 | FS2/FS4 | 0 | → (1) |
| FS1 | FS0 | FS8/FS2 | FS7/FS4 | 1 | → (2) |
| FS1 | FS3 | FS3 | FS2 | 5 | |
| FS1 | FS4 | FS1 | FS3 | 7 | |
| FS1 | FS5 | FS6 | FS5 | 23 | |
| FS1 | FS1 | FS5 | FS6 | 24 | |
| FS2 | FS1 | FS0 | FS7/FS2 | 2 | → (3) |
| FS2 | FS3 | FS5 | FS3 | 18 | |
| FS2 | FS2 | FS3 | FS5 | 19 | |
| FS2 | FS6 | FS1 | FS1 | 26 | |
| FS2 | FS4 | FS4 | FS6 | 30 | |
| FS3 | FS2 | FS1 | FS0 | 3 | |
| FS3 | FS3 | FS2 | FS1 | 4 | |
| FS3 | FS4 | FS5 | FS5 | 11 | |
| FS3 | FS6 | FS6 | FS4 | 15 | |
| FS3 | FS5 | FS3 | FS6 | 17 | |
| FS4 | FS1 | FS3 | FS3 | 6 | |
| FS4 | FS5 | FS5 | FS1 | 10 | |
| FS4 | FS3 | FS4 | FS5 | 12 | |
| FS4 | FS6 | FS2 | FS6 | 28 | |
| FS4 | FS5 | FS3 | FS6 | 29 | |
| FS5 | FS1 | FS4 | FS1 | 8 | |
| FS5 | FS5 | FS1 | FS4 | 9 | |
| FS5 | FS3 | FS6 | FS6 | 26 | |
| FS5 | FS2 | FS2 | FS3 | 20 | |
| FS5 | FS6 | FS5 | FS2 | 22 | |
| FS6 | FS4 | FS3 | FS4 | 13 | |
| FS6 | FS6 | FS4 | FS3 | 14 | |
| FS6 | FS5 | FS2 | FS2 | 21 | |
| FS6 | FS1 | FS1 | FS5 | 25 | |
| FS6 | FS2 | FS6 | FS1 | 27 | |
| FS7 | FS2 | FS4 | FS4 | 31 | |
| FS8 | FS7 | FS2 | FS4 | 32 | |

(1) : Frame Number 0 (1st AUN(Address Unit) of RUB / Middle AUN(Address Unit) of RUB)
(2) : Frame Number 1 (1st AUN(Address Unit) of RUB / Middle AUN(Address Unit) of RUB)
(3) : Frame Number 2 (1st AUN(Address Unit) of RUB / Middle AUN(Address Unit) of RUB)

*17PP modulation code conversion table*

| data bits | modulation bits | |
|---|---|---|
| 00 00 00 00 | 010 100 100 100 | |
| 00 00 10 00 | 000 100 100 100 | |
| 00 00 00 | 010 100 000 | |
| 00 00 01 | 010 100 100 | |
| 00 00 10 | 000 100 100 | |
| 00 00 11 | 000 100 | |
| 00 01 | 010 100 | |
| 00 10 | 010 000 | |
| 00 11 | 010 100 | |
| 01 | 010 | |
| 10 | 001 | |
| 11 | 000<br>101 | if preceding modulation bits = xx1<br>if preceding modulation bits = xx0 |

RECORDING MEDIUM WITH A LINKING AREA INCLUDING DUMMY DATA THEREON AND APPARATUS AND METHODS FOR FORMING, RECORDING, AND REPRODUCING THE RECORDING MEDIUM

PRIORITY STATEMENT

This present application is a continuation of U.S. patent application Ser. No. 10/753,401, filed Jan. 9, 2004 now U.S. Pat. No. 7,525,889, the entire contents of which are hereby incorporated by reference, which is a continuation-in-part of PCT International Application No. PCT/KR03/01096, filed on Jun. 4, 2003, the entire contents of which are incorporated by reference, which further claims priority of Korean Patent Application No. 2002-037146, filed on Jun. 5, 2002; Korean Patent Application No. 2002-067955, filed on Nov. 4, 2002; Korean Patent Application No. 2002-067956, filed on Nov. 4, 2002; Korean Patent Application No. 2002-077093, filed on Dec. 5, 2002; Korean Patent Application No. 2002-077094, filed on Dec. 5, 2002; Korean Patent Application No. 2002-079818, filed on Dec. 13, 2002; Korean Patent Application No. 2002-079819, filed on Dec. 13, 2002; and Korean Patent Application No. 2003-001858, filed on Jan. 11, 2003; all in the Korean Intellectual Property Office, the entire contents of which are hereby incorporated by reference.

BACKGROUND OF THE INVENTION

1. Field of the Invention

The present invention relates to dummy data of a linking area of a recording medium.

2. Discussion of the Related Art

A disc-type recording medium such as a compact disc (CD) can permanently store high-quality digital audio data, which makes such a medium popular. The "digital versatile disc" (referred as 'DVD' hereinafter) has been developed as a new disc-type recording medium. A DVD can store much more data than a CD, thus, more high-quality moving picture and/or audio data may be recorded on a DVD, which has enabled widespread use of the DVD. There are at least three types of DVD, DVD-ROM for read-only, DVD-R for write-once, and rewritable DVD-RAM or DVD-R/W.

Recently, another rewritable recording medium, called BD-RE (Blu-ray Disc REwritable), larger in storage capacity than a DVD has been introduced.

As shown in FIG. 1a, a rewritable disc, such as BD-RE including areas such as a clamping area 1, a transition area 2, a burst cutting area (BCA) 3, a lead-in area 4, a data zone, and a lead-out area 5.

The clamping area 1 is a center area to be clamped by a clamper of a disc device to fix the rotating disc, and the transition area 2 is an area between the clamping area 1 and the information area including the lead-in area 4 and the data zone. The BCA 3 is used to add information to the disc after completion of a disc manufacturing process. The lead-in area 4 may be where important information needed for disc reproduction is provided while the lead-out area 5 may be where a disc ending signal is provided.

The lead-in area 4 may be subdivided into several areas including a first guard area 1, a permanent information and control (PIC) area, a second guard area 2, the second information 2, OPC, a reserved area, and the first information 1.

The first guard 1 area is used as a protection area against overwriting of the PIC area by the BCA 3. The PIC area is an area where general information about the disc and various other information has been stored in a pre-recorded groove. The second guard area 2 is used as a buffering area for the changeover from the pre-recorded area to the rewritable area, and the first and the second information areas are used to store specific information about the disc or applications, such as control information.

FIGS. 1b and 1c show an exemplary RUB (Recording Unit Block). A single RUB, which corresponds to a single ECC (Error Correction Code) block, is composed of Run-in, physical cluster, Run-out, and guard areas, as shown in FIG. 1b. If more than one RUB, for example, successive RUBs, are created at one time to store real-time input data, e.g., A/V data, the set of Run-in, physical and Run-out is repeated as many times as necessary and a guard area 'Guard_3' is formed at the end, as shown in FIG. 1c.

The Run-in area, as shown in FIG. 2a, may include a 1100-channel-bit guard 'Guard_1' and a 1660-channel-bit preamble 'PrA'. 55 repetitions of a 20-channel-bit pattern are written in the guard 'Guard_1' to indicate the head of an RUB while the first sync data 'Sync_1' and the second sync data 'Sync_2', which are 30 channel bits in length, are written in the preamble 'PrA'. Each sync data is composed of 24-bit sync body and 6-bit sync ID. The sync IDs of the first and the second sync data are '000 100'(FS4) and '010 000'(FS6), respectively.

The Run-out, as shown in FIG. 2b, is composed of a 540-channel-bit guard 'Guard_2' and a 564-channel-bit postamble 'PoA' including the third sync data 'Sync_3'. The third sync data also includes a 24-bit sync body and 6-bit sync ID. The third sync ID is '000 001'(FS0).

The guard 'Guard_2' is created to prevent overlap between previously-recorded data and new data to be recorded and may have 27 repetitions of a 20-channel-bit pattern to indicate the end of a previously-recorded area, namely, a just-recorded RUB.

User data is written in the physical cluster and the user data is restored to original data by a signal processor that uses a clock synchronized with sync data written in the Run-in.

FIG. 1d shows recording format of a physical cluster of a BD-RE where 31 recording frames (frames #0~#30) are recorded. The mutually-different 7 frame syncs used for BD-RE (FSs #0 to #6) may be written in the 31 recording frames in a unique order, as shown in FIG. 1d.

FIG. 1e shows the types and patterns of frame syncs to be written in a physical cluster. As shown in FIG. 1e, a total 7 frame syncs are used and each frame sync is composed of 24-bit sync body and 6-bit sync identifying pattern which is different among the 7 frame syncs.

Each RUB, which corresponding to a single ECC block, has physical address information, e.g., an address unit number (AUN) to enable random access of an arbitrary RUB written on a BD-RE. The physical address information is written in a physical cluster of an RUB after modulated and encoded along with audio/video (A/V) data. An AUN is derived from physical sector number (PSN) that has not been actually written on a BD-RE.

In the case of a write-once or a rewritable disc (DVD-R, -RW, -RAM, +R, +RW), a linking frame is created behind a previously-recorded area before new data is recorded discontinuous with the previously-recorded data. However, a read-only disc, such as DVD-ROM and video CD, does not need a linking frame to link two data sections because it contains completely-recorded data.

Such a difference between a writable and a read-only disc requires an ordinary disc player, such as a DVD-player or a DVD-ROM drive, to be equipped with additional hardware and/or software to play back both types of discs.

A disc device capable of recording/reproducing a writable disc should also be equipped with additional hardware and/or software to play back a read-only disc as well as a writable disc.

The standard of a high-density read-only recording medium, called 'BD-ROM', is also under discussion together with the standardization of a BD-RE. If the physical format of a BD-ROM was the same as BD-RE, a disc player would be able to apply the same reproduction algorithm to both recording media. In addition, both types of disks should be distinguishable, as well as, have compatible formats. A suitable solution to harmonize these contrary conditions has not yet been provided.

SUMMARY OF THE INVENTION

In exemplary embodiments, the present invention is directed to a recording medium, such as a high-density and/or read-only recording medium that has the same or similar physical recording format, including a linking area, in order to improve reproduction compatibility with a high-density and/or rewritable recording medium, and to methods and apparatuses for forming, recording, and reproducing the recording medium.

In exemplary embodiments, the present invention is directed to a recording medium, such as a high-density and/or read-only recording medium with sync data in a linking area whose bit pattern is different from sync data written in data recording area, and to methods and apparatuses for forming, recording, and reproducing the read-only recording medium.

In exemplary embodiments, the present invention is directed to a recording medium, such as a high-density and/or read-only recording medium with a physical address in a linking area along with a frame sync and to methods and apparatuses for forming, recording, and reproducing the read-only recording medium.

In exemplary embodiments, the present invention is directed to a recording medium, such as a high-density and/or read-only recording medium with a linking area where scrambled data is written, and to methods and apparatuses for forming, recording, and reproducing the read-only recording medium.

In exemplary embodiments, the present invention is directed to a recording medium, such as a high-density and/or read-only recording medium with a linking area that includes data scrambled in the same or similar manner as main data, and to methods and apparatuses for forming, recording, and reproducing the read-only recording medium.

In exemplary embodiments, the present invention is directed to a recording medium, such as a high-density and/or read-only recording medium with a linking area that includes data scrambled by using values derived from physical sectors associated with data frames within a previous and/or subsequent physical cluster, and to methods and apparatuses for forming, recording, and reproducing the read-only recording medium.

In exemplary embodiments, the present invention is directed to a recording medium, such as a high-density and/or read-only recording medium with dummy data in its linking areas, and to methods and apparatuses for forming, recording, and reproducing the read-only recording medium.

In exemplary embodiments, the present invention is directed to a recording medium, such as a high-density and/or read-only recording medium with a linking area that includes data recorded in a error-recoverable format, and to methods and apparatuses for forming, recording, and reproducing the read-only recording medium.

In exemplary embodiments, the present invention is directed to a recording medium, such as a high-density and/or read-only recording medium with a linking area in an area corresponding to a run-in and/or run-out area of a rewritable recording medium, and to methods and apparatuses for forming, recording, and reproducing the read-only recording medium.

In exemplary embodiments, the present invention is directed to a recording medium, such as a high-density and/or read-only recording medium with a linking area that includes a recording frame of desired size, and to methods and apparatuses for forming, recording, and reproducing the read-only recording medium.

In exemplary embodiments, the present invention is directed to a recording medium, such as a high-density and/or read-only recording medium with useful information written in the recording frame, and to methods and apparatuses for forming, recording, and reproducing the read-only recording medium.

In exemplary embodiments, the present invention is directed to a recording medium, such as a high-density and/or read-only recording medium with a linking area between recorded data sections wherein each linking area includes at least one sync signal indicative of the linking area, and to methods and apparatuses for forming, recording, and reproducing the read-only recording medium.

In exemplary embodiments, the present invention is directed to a recording medium, such as a high-density and/or read-only recording medium with a sync signal written in a linking area which is different from a sync signal written in a data section, and to methods and apparatuses for forming, recording, and reproducing the read-only recording medium.

In exemplary embodiments, the present invention is directed to a recording medium, such as a high-density and/or read-only recording medium with data scrambled by a physical address written before or after the linking area, and to methods and apparatuses for forming, recording, and reproducing the read-only recording medium.

In exemplary embodiments, the present invention is directed to a recording medium, such as a high-density and/or read-only recording medium with data scrambled by a frame sync written therein, and to methods and apparatuses for forming, recording, and reproducing the read-only recording medium.

In exemplary embodiments, the present invention is directed to a recording medium, such as a high-density and/or read-only recording medium with data scrambled by a provided value, and to methods and apparatuses for forming, recording, and reproducing the read-only recording medium.

In exemplary embodiments, the present invention is directed to a recording medium, such as a high-density and/or read-only recording medium with dummy data recorded in a recording frame within a linking area, and to methods and apparatuses for forming, recording, and reproducing the read-only recording medium.

In exemplary embodiments, the present invention is directed to a recording medium, such as a high-density and/or read-only recording medium with information indicative of physical address written in a recording frame, and to methods and apparatuses for forming, recording, and reproducing the read-only recording medium.

In exemplary embodiments, the present invention is directed to a recording medium, such as a high-density and/or read-only recording medium with user data written in the form of an error correction code (ECC) block in a recording frame, and to methods and apparatuses for forming, recording, and reproducing the read-only recording medium.

In exemplary embodiments, the present invention is directed to a recording medium, such as a high-density and/or read-only recording medium with data written in a recording frame within the linking area, processed in the same or similar manner as user data in a data frame, and to methods and apparatuses for forming, recording, and reproducing the read-only recording medium.

In exemplary embodiments, the present invention is directed to a recording medium, such as a high-density and/or read-only recording medium with a defined area, where a recording unit block (RUB) is to be written, corresponding to a run-in and run-out area of a rewritable recording medium, with a defined sized recording frame, and to methods and apparatuses for forming, recording, and reproducing the read-only recording medium.

In exemplary embodiments, the present invention is directed to a recording medium, such as a high-density and/or read-only recording medium with a defined area, where a RUB is to be written, corresponding to a run-in and run-out area of a rewritable recording medium, with defined sized recording frame, wherein a frame sync having a unique bit pattern is written in at least one recording frame, and to methods and apparatuses for forming, recording, and reproducing the read-only recording medium.

In exemplary embodiments, the present invention is directed to a recording medium, such as a high-density and/or read-only recording medium with a defined area, where a RUB is to be written, corresponding to a run-in and run-out area of a rewritable recording medium, with a defined sized recording frame, where a frame sync having a unique bit pattern is provided at least twice, and to methods and apparatuses for forming, recording, and reproducing the read-only recording medium.

In exemplary embodiments, the present invention is directed to a recording medium, such as a high-density and/or read-only recording medium with a defined area, where a RUB is to be written, corresponding to a run-in and run-out area of a rewritable recording medium, with a defined sized recording frame, wherein a frame sync having a unique bit pattern is written in at least one recording frame, and to methods and apparatuses for forming, recording, and reproducing the read-only recording medium.

In an exemplary embodiment, the present invention is directed to a recording medium including a data area including at least two data sections and a linking area to link neighboring data sections, the linking area including dummy data.

In another exemplary embodiment, the present invention is directed to a method of forming a recording medium including forming a linking area to link neighboring data sections of a data area while recording data onto the recording medium and writing dummy data in the linking area to link the neighboring data sections.

In another exemplary embodiment, the present invention is directed to a method of reproducing data from a recording medium including utilizing a linking area, including dummy data, which links neighboring data sections of a data area, to reproduce the data.

In another exemplary embodiment, the present invention is directed to a method of recording data on a recording medium including utilizing a linking area, including dummy data, which links neighboring data sections of a data area, to record the data.

In another exemplary embodiment, the present invention is directed to an apparatus for reproducing data from a recording medium, the apparatus utilizing a linking area, including dummy data, which links neighboring data sections of a data area, to reproduce the data.

BRIEF DESCRIPTION OF THE DRAWINGS

The above features and other advantages of the present invention will be more clearly understood from the following detailed description taken in conjunction with the accompanying drawings, in which:

FIG. 1d shows the structure of a physical cluster of a BD-RE;

FIG. 1e shows frame syncs used for a BD-RE;

FIGS. 7a to 7c show structures of each linking frame in a linking area and illustrate frame syncs written therein in accordance with an exemplary embodiment of the present invention;

FIG. 11a is a block diagram of an exemplary linking frame constructing circuit to create a linking frame with input user data as shown in FIG. 4a;

FIG. 12b is an exemplary block diagram of a scrambler to scramble user data into the linking frame shown in FIG. 12a;

FIG. 15b shows an exemplary data recording case in the ECC format in the exemplary embodiment of FIG. 15a;

FIG. 15c shows an exemplary small-sized useful data recording case in the ECC format in the exemplary embodiment of FIG. 15a.

DETAILED DESCRIPTION OF EXEMPLARY EMBODIMENTS

In order that the invention may be fully understood, exemplary embodiments thereof will now be described with reference to the accompanying drawings.

First, a linking area of a high-density recording medium structured in accordance with exemplary embodiments of the present invention and data recording techniques related to the linking area in accordance with exemplary embodiments of the present invention, namely, data forming techniques are explained in more detail.

Hereinafter, the terms of 'write', 'record' and 'form' are used to represent same meaning for a read-only recording medium, such as a read-only medium. A frame formed in the linking area may also be referred to as a linking frame or recording frame.

(1) Structure of a Linking Area

Figure 1A:
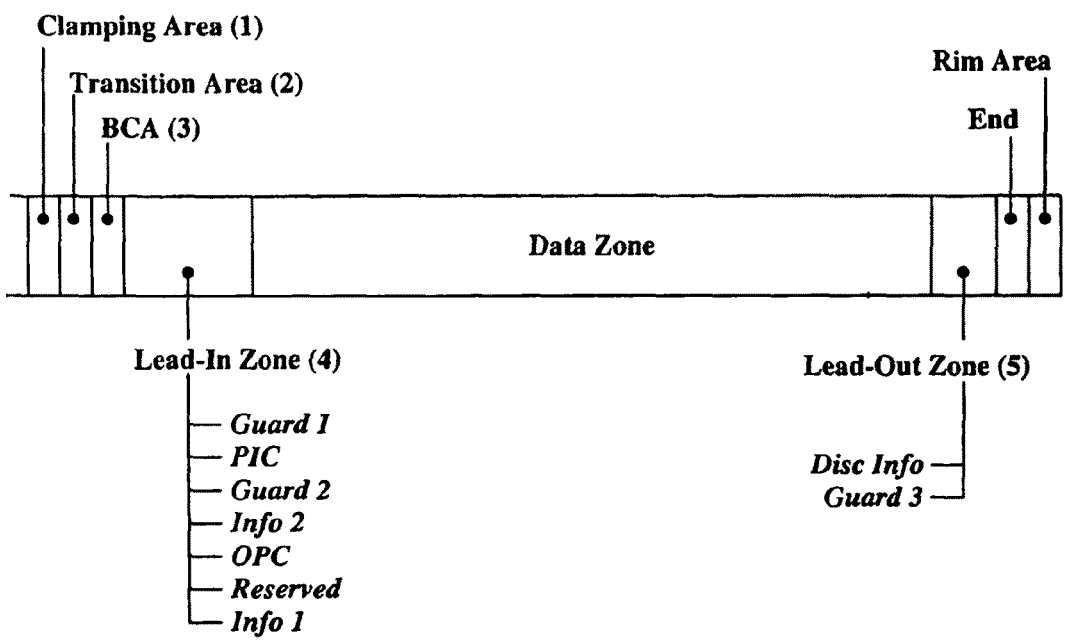
FIG. 1a shows the structure of a rewritable disc BD-RE (Blu-ray Disc REwritable)
Figure 1B:
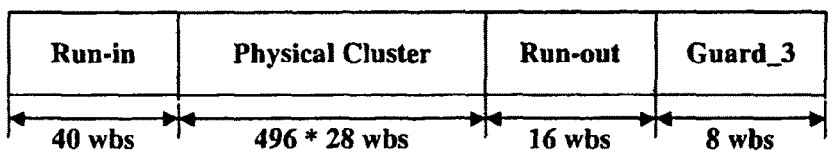
FIGS. 1b and 1c show respective formats of a recording unit block of a BD-RE.

A recording medium, such as a high-density and/or read-only recording medium, e.g., a BD-ROM structured in accordance with an exemplary embodiment of the present invention may have a physical format composed of a Run-in area, a physical cluster, a Run-out area, and guard areas such as those described with reference to FIGS. 1 and 2 for a high-density, rewritable recording medium.

Figure 3A:
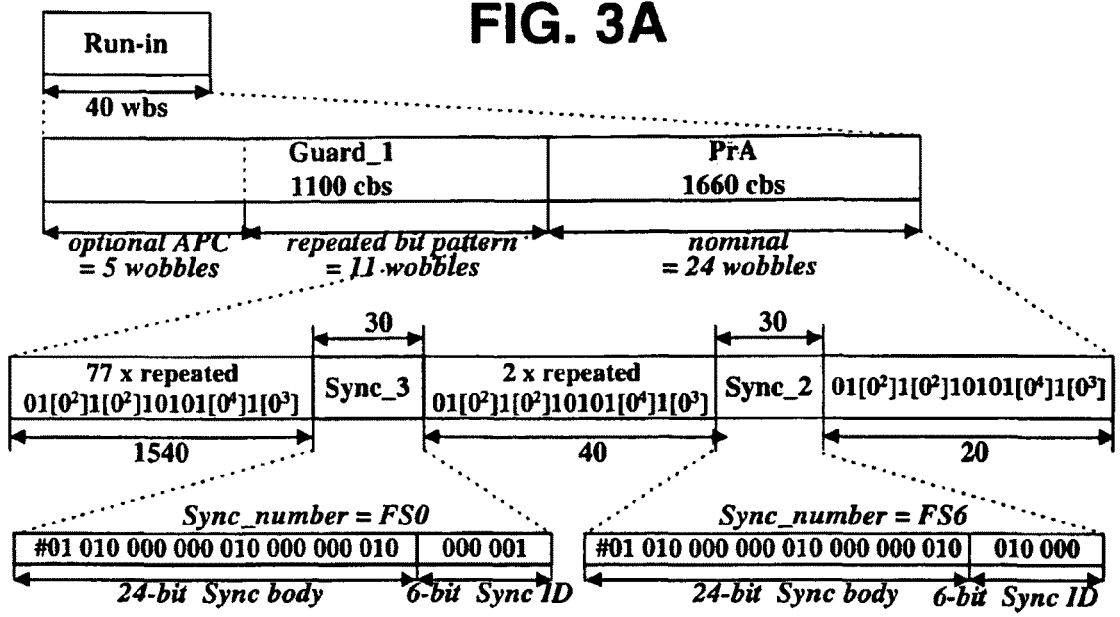
FIGS. 3a and 3b show respective formats of a Run-in and Run-out area formed in a recording unit block of a BD-ROM in accordance with an exemplary embodiment of the present invention.

The Run-in area in accordance with an exemplary embodiment of the present invention may be, as shown in FIG. 3a, composed of a guard 'Guard_1' and a preamble 'PrA' that includes two sync data. Each sync data may include 24-bit sync body and 6-bit sync ID.

Figure 2A:
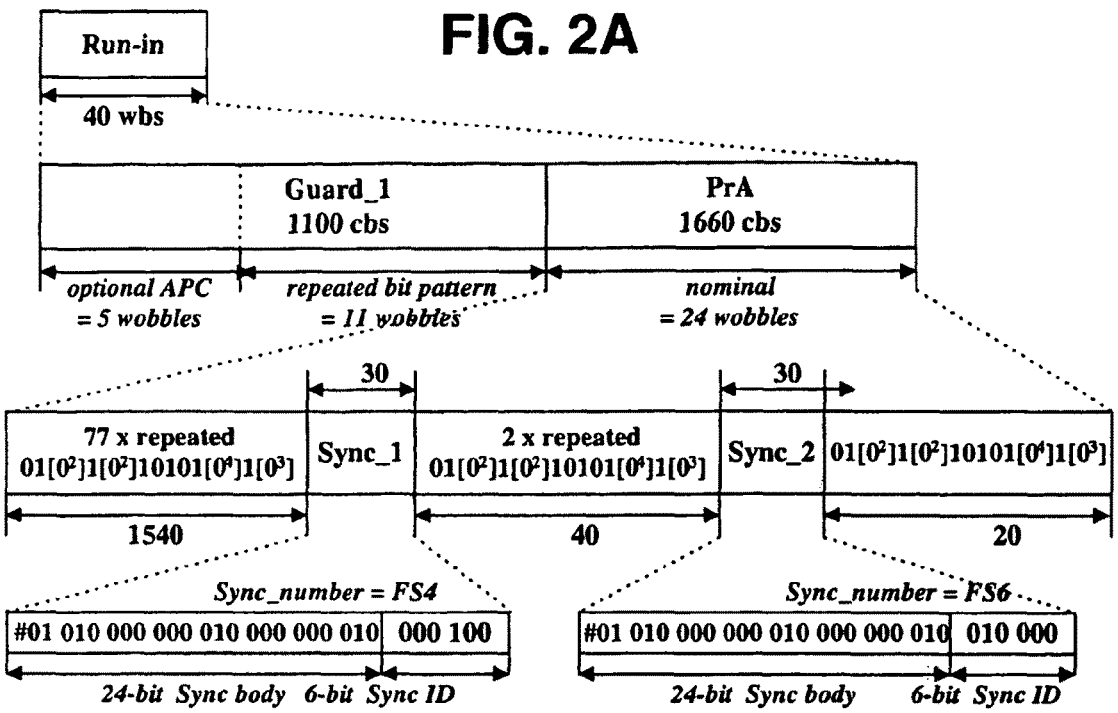
FIGS. 2a and 2b show a Run-in and Run-out area, respectively, included in a recording unit block of a BD-RE.

While sync IDs of sync data in a preamble of a BD-RE may be '000 100' and '010 000' as shown in FIG. 2a, the preamble of a BD-ROM structured in accordance with exemplary embodiments of the present invention may include two sync data whose IDs are FS0('000 001') (Sync_3) and FS6('010 000') (Sync_2). The sync data 'Sync_3' may be placed ahead of the sync data 'Sync_2'.

Figure 3B:
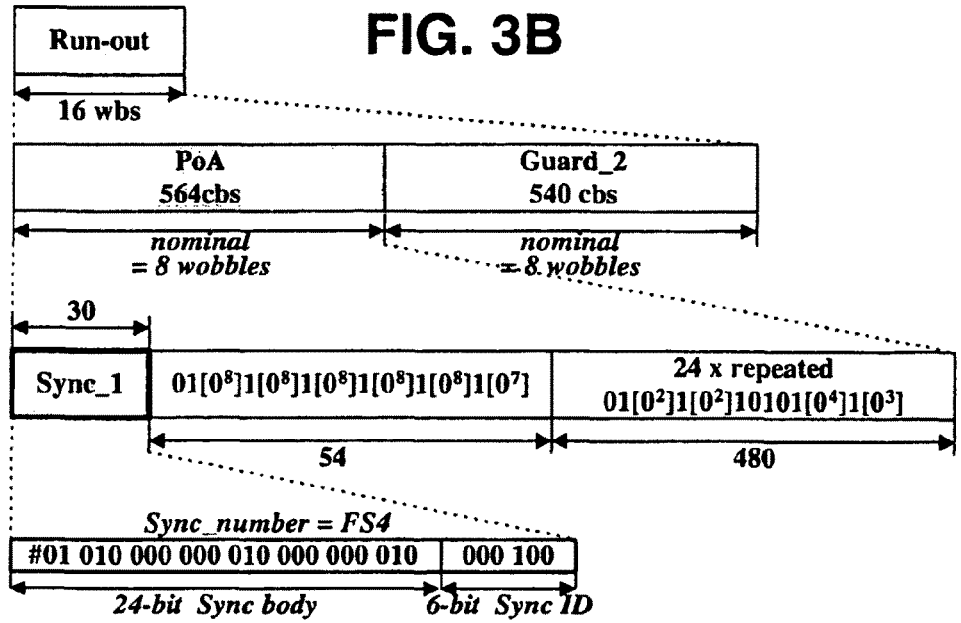

In addition, the post-amble 'PoA' in the Run-out area of a BD-ROM structured in accordance with exemplary embodiments of the present invention, as shown in FIG. 3b, may include sync data whose ID is FS4('000 100') (Sync_1). This is different from a BD-RE in that sync data with sync ID of FS0('000 001') is written in the post-amble of a BD-RE.

Figure 1C:
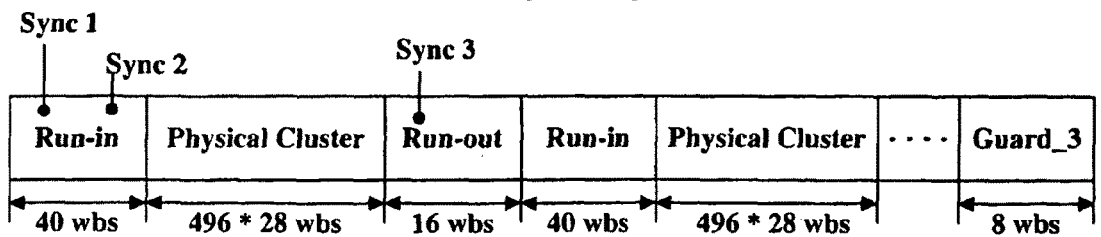
Figure 2B:
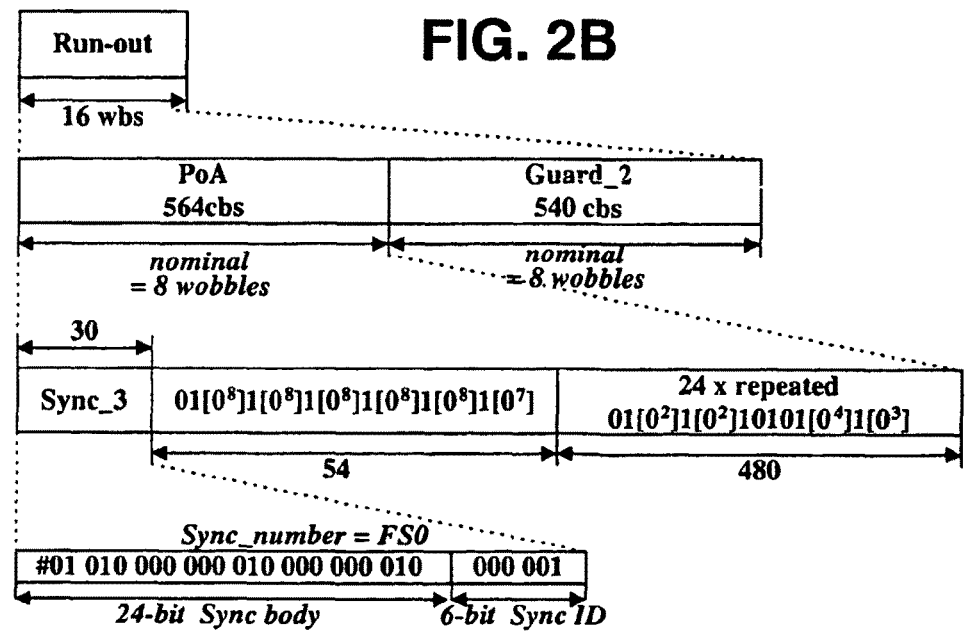

In the case of a BD-RE, if two RUBs are created, a pair of Run-in and Run-out areas are formed, as illustrated in FIG. 1c. The pair of Run-in and Run-out areas (that correspond to a linking area) include three sync data whose recording order is 'Sync_', 'Sync_2' and 'Sync_3'. The recording order of the BD-ROM may be 'Sync_3', 'Sync_2' and 'Sync_1' which is in a reverse order of the BD-RE.

Consequently, although the BD-ROM structured in accordance with exemplary embodiments of the present invention is similar to or the same as, in physical recording format, to a BD-RE, the BD-ROM can be distinguished from a BD-RE because of different sync data writing order in a linking area. In addition, whether or not a current area is a linking area of a BD-ROM may be determined based on the arrangement of the sync data.

In the above exemplary embodiment, the Run-in, Run-out and the guard 'Guard_3' areas may include information similar to the corresponding recorded areas of a BD-RE.

Figure 4A:
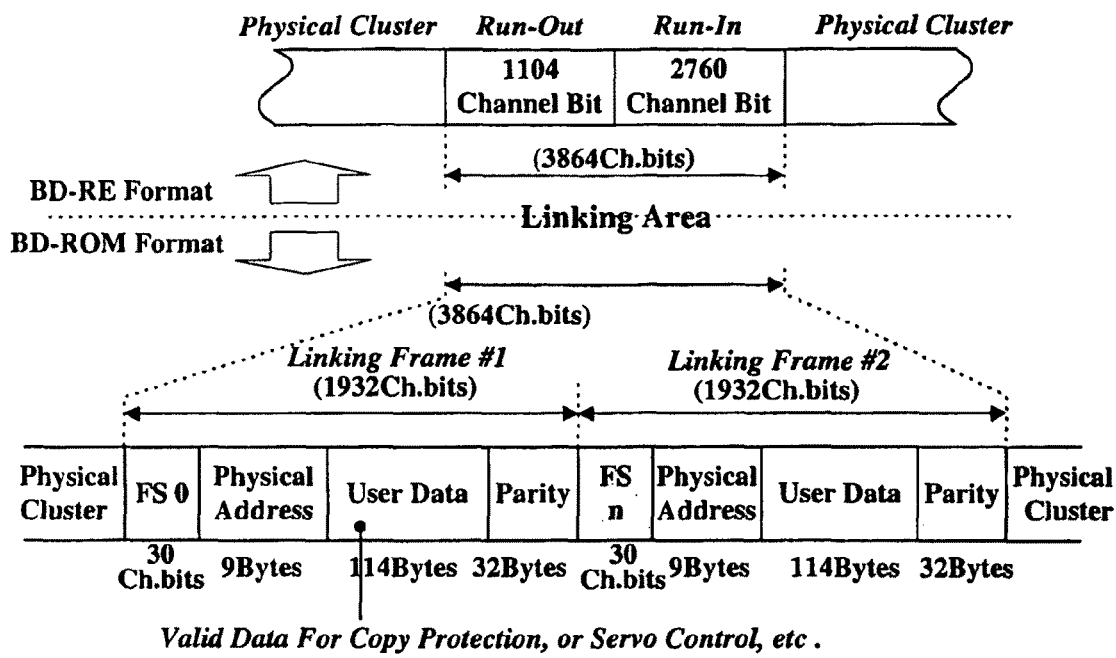
FIG. 4a shows a format of a linking area of a BD-ROM in accordance with another exemplary embodiment of the present invention.

Another exemplary linking area for a BD-ROM is shown in FIG. 4a. As shown in FIG. 4a, in an exemplary embodiment of a BD-ROM, two linking frames of the same size (1932 channels bits) may constitute a single linking area. In contrast, for a BD-RE, a 1104-bit Run-in and 2760-bit Run-out area may be provided, which are different in size, but also constitute a single linking area.

The two linking frames may be of the same structure and each frame may be composed of a 30-channel-bit frame sync, a 9-byte physical address, a 114-byte user data, and a 32-byte parity.

The 114-byte user data may include a variety of additional information, e.g., anti-piracy information that makes it more difficult or impossible to illegally copy contents, such as a movie recorded on a BD-ROM to another medium, or control information usable for a servo-control operation.

Figure 4B:
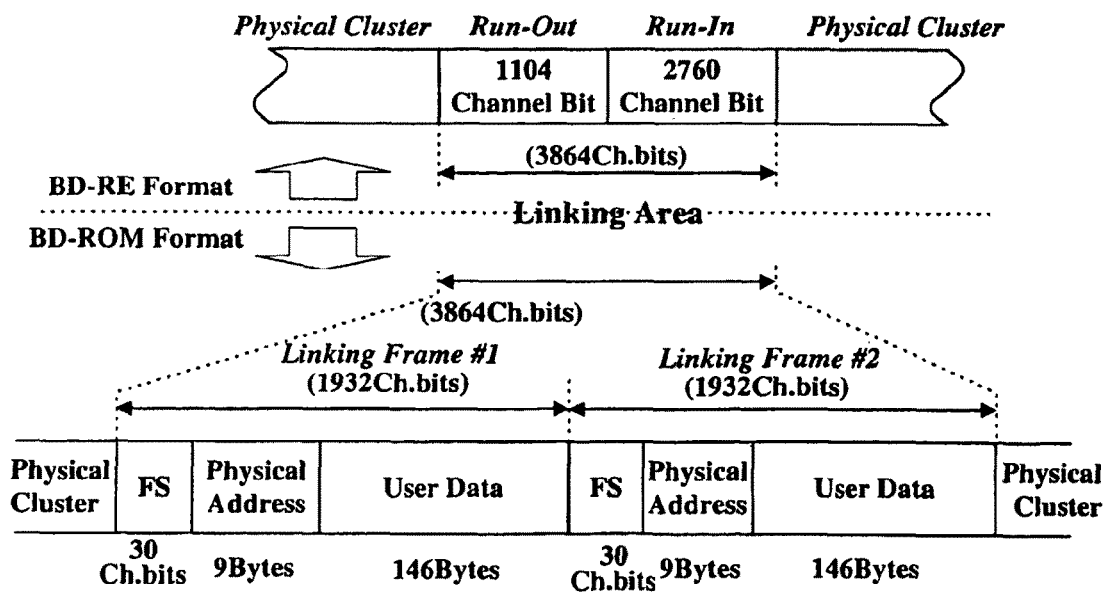
FIG. 4b shows format of a linking area of a BD-ROM in accordance with another exemplary embodiment of the present invention.

FIG. 4b illustrates another exemplary embodiment of the present invention. The linking area in this exemplary embodiment may be composed of two equal-sized (1932 channel bits) linking frames and each frame may be composed of a 30-channel-bit frame sync, a 9-byte physical address, a 146-byte user data. Compared with FIG. 4a, the exemplary embodiment of FIG. 4b has no parity.

Useful information can be written in the 146-byte user data space. The useful information may include anti-piracy information that makes it more difficult or impossible to illegally copy contents such as a movie recorded on a BD-ROM to another medium, or control information usable for a servo-control operation.

Figure 4C:
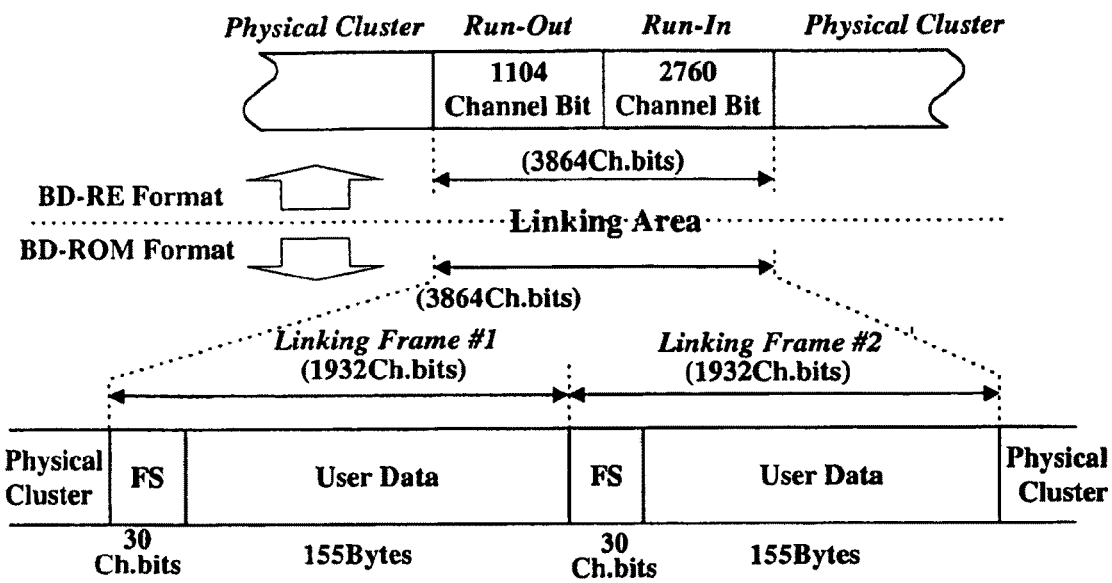
FIG. 4c shows format of a linking area of a BD-ROM in accordance with another exemplary embodiment of the present invention.

FIG. 4c illustrates another exemplary embodiment of the present invention. The linking area in this exemplary embodiment may be composed of two equal-sized (1932 channel bits) linking frames. Each frame may be composed of a 30-channel-bit frame sync and 155-byte user data. Compared with FIG. 4a, the exemplary embodiment of FIG. 4c has no physical address and no parity. This exemplary embodiment is also different from that of FIG. 4b in that it has no physical address.

Figure 4D:
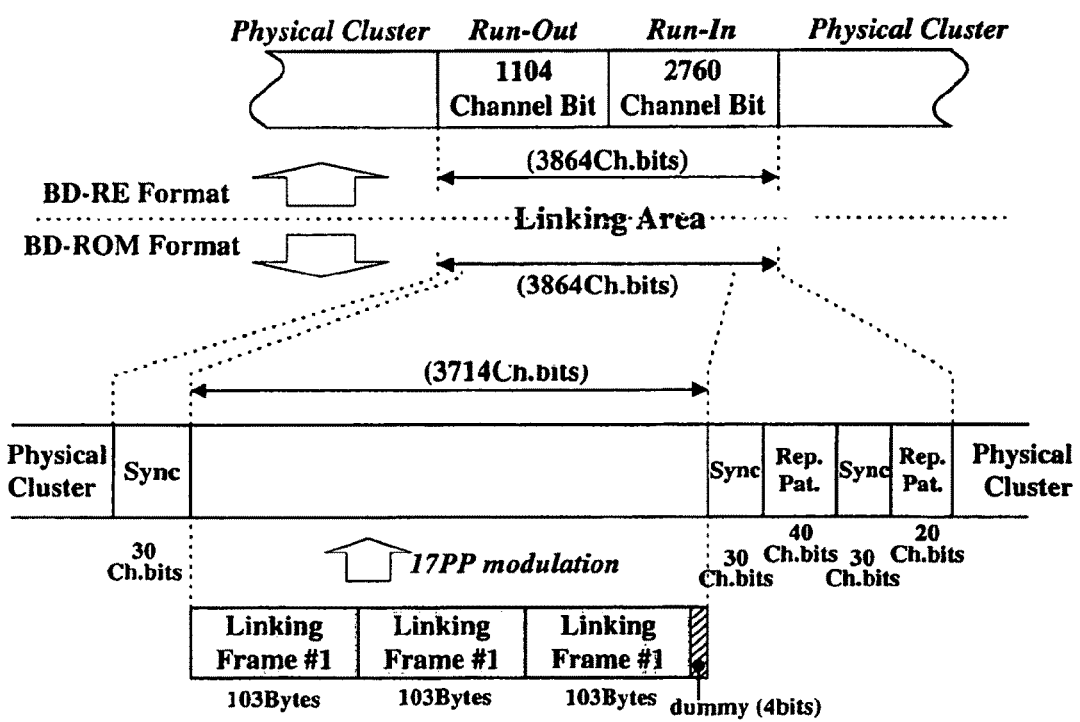
FIG. 4d shows format of a linking area of a BD-ROM in accordance with another exemplary embodiment of the present invention.

FIG. 4d illustrates another exemplary embodiment of the present invention. The linking area in this exemplary embodiment may be composed of a 30-channel-bit leading frame sync, a 3714-channel-bit linking part, two 30-channel-bit rear syncs, and two repetition patterns that are 40 and 20 channel bits long, respectively. The 3714-channel-bit linking part may be composed of three linking frames and 4-bit dummy data.

Although FIGS. 4a-4d illustrate exemplary embodiments of linking areas, any other arrangement could also be utilized as would be known to one of ordinary skill in the art based on the structures described above Data may be written in the form of ECC block in the physical cluster and the aforementioned seven frame syncs FS0~FS6 may be used in an ECC block in general.

Figures 5, 6A, 6B:
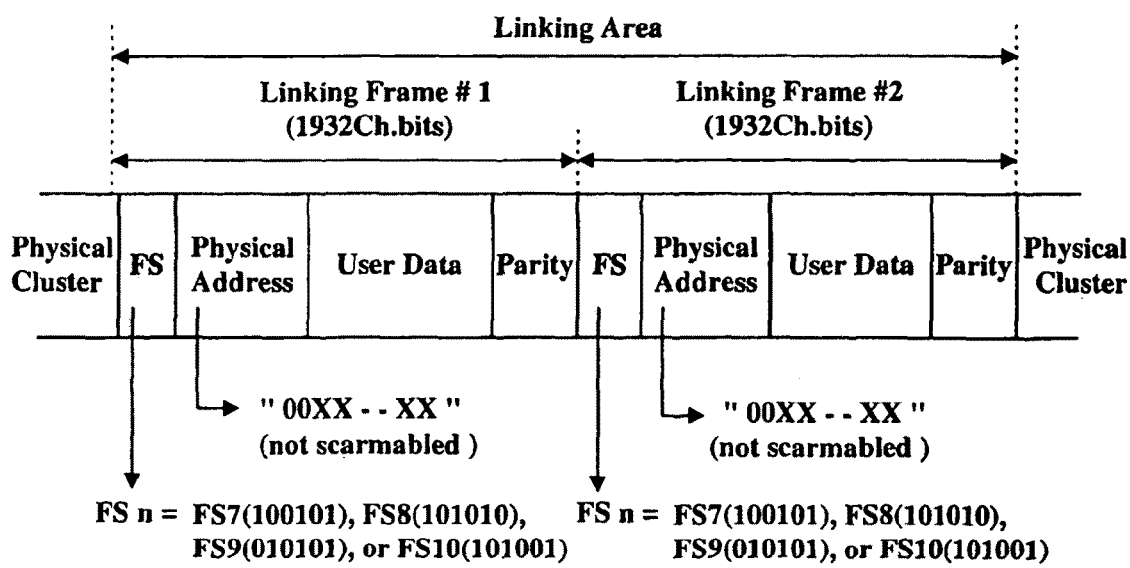
FIG. 5 shows new frame syncs defined in accordance with an exemplary embodiment of the present invention.
FIG. 6a shows the structure of a linking area to link physical clusters formed on a BD-ROM and applicable frame syncs in accordance with an exemplary embodiment of the present invention.
FIG. 6b illustrates frame syncs to be used for linking frames in accordance with an exemplary embodiment of the present invention.

In an exemplary embodiment of the present invention, at least one linking frame of the two shown in FIG. 4a-4d may use a new frame sync 'FS n' that is different in sync ID from the seven frame syncs used for BD-RE. Examples of the sync ID of the new frame sync 'FS n' are '100 101' (FS7), '101 010' (FS8), '010 101'(FS9), or '101 001'(FS10), as shown in FIG. 5.

All of the four exemplary sync candidates satisfy a constraint that a transition shift, which is specified for a BD-RE, is not shorter in bit pattern than 2 bits.

In the exemplary embodiment of FIG. 4a, the frame sync FS0 is written in the first linking frame and the frame sync 'FS n' in the second.

Data recorded onto a BD-ROM must satisfy 'Prohibit RMTR (Run-Limited TRansition)' constraint of 17PP (Parity Preserve) modulation code, which is the data recording standard defined for a BD-RE.

The Prohibit RMTR constraint, which ensures stable detection of an RF signal, states that a minimum run length 2T, namely, '01' or '10' must not be repeated continuously more than six times. Therefore, a frame sync with a smaller transition frequency may be used, namely, '100 101'(FS7) or '101 001'(FS10) among the new frame syncs to make successive bit trains satisfy the Prohibit RMTR constraint. The usage of frame syncs is explained in more detail with reference to FIGS. 6a-6b.

The first case illustrated in FIG. 6b is the exemplary embodiment of FIGS. 3A and 3B. In this exemplary embodiment, two 1932-channel-bit recording frames are recorded in a linking area and each recording frame is composed of a frame sync, a physical address, user data, and parity. At least one of the two recording frames may include the newly-defined frame sync 'FS n'.

For instance, the frame sync 'FS0' with its identifying pattern (ID) '000 001' may be written as the first frame sync while the new frame sync 'FS n', whose sync identifying pattern is '010 101', '101 010', '100 101', or '101 001' is written in the second.

In the event that the new frame sync 'FS n' whose sync identifying pattern is '010 101', '101 010', '100 101' or '101 001' is used, the 9-byte physical address following the frame sync 'FS n' has an unscrambled starting data '00' as illustrated in FIG. 6a. This is because it may be advantageous to satisfy the RMTR constraint of 17PP modulation codes defined for data recording on a BD-RE.

Figures 7D, 8:
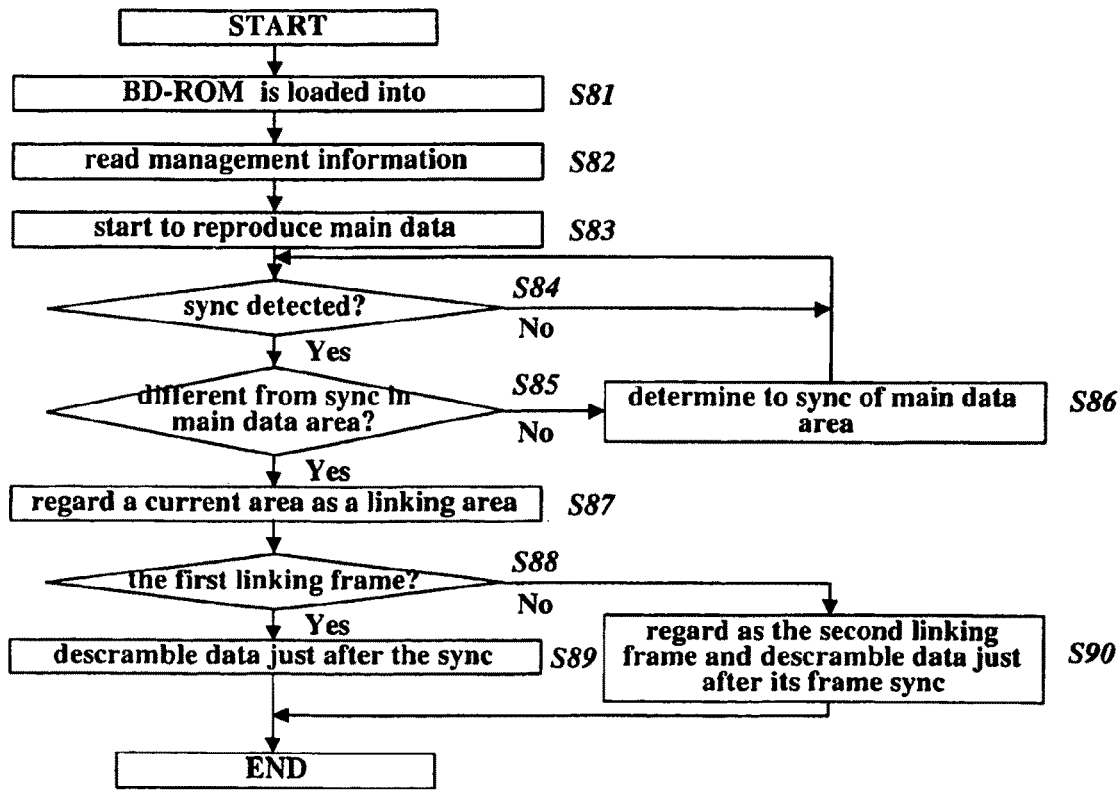
FIG. 7d is an exemplary conversion table of 17PP modulation.
FIG. 8 is a flow diagram to reproduce each linking frame in accordance with an exemplary embodiment of the present invention.

For example, if the new frame sync FS7 with sync identifying pattern of '100 101' is used and, at the same time, the following user data bits are "01 11 01 11" whose modulated bits by 17PP modulation table given in FIG. 7d are "010 101 010 101", the final modulated bits including the sync identifying pattern constitute "100 101 010 101 010 101" where a 2T pattern, the pattern of one zero between neighboring two ones, occurs seven times continuously.

However, if user data includes '00' at its head, the above user data example becomes "00 01 11 01 11" whose 17PP modulated bit train is "010 100 101 010 101". Therefore, the final bits with the sync identifying pattern constitute "100 101 010 100 101 010 101" where three 2T patterns, a 3T and four 2T patterns occurs sequentially.

A second case illustrated in FIG. 6b is the exemplary embodiment of FIG. 4A. In this exemplary embodiment, two 1932-channel-bit recording frames may be recorded in a linking area and each recording frame may be composed of a frame sync, a physical address, user data, and parity. At least one of the two recording frames includes the frame sync FS0('000 001') and another one of the newly-defined frame syncs 'FS n'.

For instance, the frame sync FS0 with its identifying pattern '000 001' is written as the first frame sync while the new frame sync FS10 whose sync identifying pattern is '101 001' is written in the second.

In the event that the new frame sync 'FS10' is used, the RMTR constraint of 17PP modulation codes defined for data recording on a BD-RE is automatically satisfied. Consequently, the following physical address need not be started with '00'.

For example, if the new frame sync 'FS10' with sync identifying pattern of '101 001' is used and, the following user data bits are "01 11 01 11" whose modulated bits by 17PP modulation table given in FIG. 7d are "010 101 010 101", the final modulated bit train with the sync identifying pattern constitutes "101 001 010 101 010 101" where one 2T, one 3T and six 2T patterns arise.

A third case illustrated in FIG. 6b is the exemplary embodiment of FIG. 4B. In this exemplary embodiment, two 1932-channel-bit recording frames may be recorded in a linking area and each recording frame may be composed of a frame sync, a physical address, user data, and parity. Both recording frames may include the newly-defined frame sync 'FS n'.

For instance, both the first and the second frame syncs use one of the new frame syncs, such as, FS7('010 101'), FS8 ('101 010'), or FS9('100 101').

In the event that the new frame sync FS7, FS8 or FS9 is used, a physical address of 9 bytes following the frame sync FS7, FS8 or FS9 has an unscrambled starting data '00' as illustrated in FIG. 6a. As described above, this is to better satisfy the RMTR constraint of 17PP modulation codes defined for data recording on a BD-RE.

In case that the new frame sync FS7('100 101') is used, the RMTR constraint can be satisfied by writing user data space following the frame sync having data other than "01 11 01 11".

A fourth case illustrated in FIG. 6b is the exemplary embodiment of FIG. 4C. In this exemplary embodiment, two 1932-channel-bit recording frames may be recorded in a linking area and each recording frame may be composed of a frame sync, a physical address, user data, and parity. Both recording frames may include the new frame sync FS10('101 001', as an example.

In the event that the new frame sync 'FS10' is used for both data frames, the RMTR constraint of 17PP modulation codes defined for data recording on a BD-RE is automatically satisfied. Consequently, the physical address following each frame sync need not be started with bits '00'.

If the newly-defined frame sync 'FS n' is used as explained above, whether a current area is within a linking area or not is determined more easily and more accurately because the new frame sync is different from those used in a physical cluster.

For example, in case that a frame sync combination is used to determine a current area, because a frame sync combination made from 'FS n' written in a linking area and FS4, FS4, and FS2 written respectively in the 29th to the 31st recording frames (Recording Frames #28 to #30) within a previous physical cluster becomes FSn-FS4 or FSn-FS2, which is different from a combination made from frame syncs written in a physical cluster, whether a current area may be within a linking area is determined accurately based on the frame sync combination.

The above explained several exemplary embodiments may be summarized as follows.

If adequate constraint is imposed on data to be written just after a frame sync, any of the four new frame syncs can be used in any combination.

For instance, if a physical address is written behind a frame sync, if the physical address always has a header of bits '00' the frame syncs FS8 and FS9 can be used.

Even if a physical address is not written, if a certain byte, e.g., '08h' (0000 1000) is written without being scrambled just behind a frame sync, a bit train "000 100 100 100" modulated from '08h' by the 17PP modulation is placed after a frame sync, so that any of the four new frame syncs FS7-FS10 can be used irrespective of the RMTR constraint.

Frame syncs, such as one of the four new frame syncs FS7-FS10, may be written in a linking frame while one of the already-known frame syncs FS0-FS6 is in the other linking frame. The new frame syncs can be used in both of linking frames as shown in the cases 3 and 4 of FIG. 6.

Figure 9:
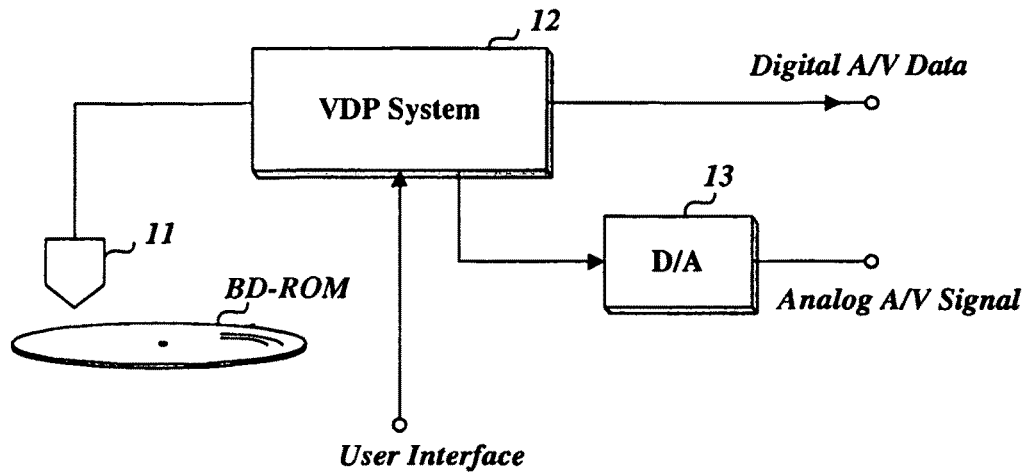
FIG. 9 is a simplified block diagram of a player to play a recording medium in accordance with an exemplary embodiment of the present invention.

If at least one new frame sync 'FS n' is used in a linking frame, a disc player, that includes an optical pickup 11, a VDP system 12, and a D/A converter 13 as depicted in FIG. 9, can detect whether a currently-read frame is within a linking area or a data section (physical cluster) while reproducing recorded data from a BD-ROM.

In case of a BD-RE, 31 recording frames individually include one of seven different frame syncs. However, seven frame syncs may not be enough to define 31 recording frames uniquely, so that a frame sync in the previous recording frame or frames is used to identify a current recording frame along with a frame sync in the current frame.

In other words, a recording frame N can be identified by successive syncs of its own frame sync and the frame sync in the previous recording frames N−1, N−2, and/or N−3. That is, although one or two previous syncs N−1 and/or N−2 are not detected, the last-detected sync N−3 can be used to identify the recording frame N along with its sync.

For instance, if a current recording frame is the seventh, namely, recording frame #6, its frame sync is FS1 as shown in FIG. 1d. However, the frame sync FS1 is also written in the frames #1, #23, and #24, so that previously-detected frame sync is used to identify the current frame. The currently-detected frame sync FS1 and the previously-detected frame sync or syncs FS4, FS1, and/or FS3, which are respectively in the frames #5, #4, and #3, enable the current frame to be identified.

Because an arrangement of frame syncs may be used to identify a data frame as explained above, frame sync sequence from previous data frame to a recording frame within a linking area using the newly-defined frame sync can be accomplished. This is explained in more detail with reference to FIGS. 7a to 7c.

FIGS. 7a to 7c show applicable frame sync sequences in accordance with exemplary embodiments of the present invention.

FIG. 7a is an example for the first case shown in FIGS. 6a and 6b and FIGS. 7b and 7c are examples for a sync pair of FS7-FS7 and FS7-FS8 of the third case shown in FIG. 6b, respectively.

If frame syncs of FS0 and FS7 are used as given in FIG. 7a, the frame syncs of frames N, N−1, and N−3 before the frame #0 with frame sync FS0 are FS7, FS0 and FS2 sequentially as case (1) shows. This frame #0 corresponds to the first address unit of RUB. As the case (2) shows, three frames before the frame #0 at the second row have frame syncs of FS2, FS4 and FS4, sequentially. This frame #0 correspond to the middle address unit of RUB. As the case (3) shows, three frames before the frame #1 have frame sync sequence of FS0, FS7/FS2 and FS4, so that this frame #1 corresponds to the first address unit or the middle unit of RUB. In addition, the three frames before the frame #2 are FS1, FS0 and FS7/FS2 sequentially in their frame syncs as the case (4) shows, so that this frame #2 corresponds to the first or the middle unit of RUB.

As depicted by the 'A'-marked case of FIG. 7a, both the frame #0 corresponding to the middle address unit of RUB and the frame #31 (the first linking frame) in accordance with exemplary embodiments of the present invention have the same frame sync sequence of previous frames. Therefore, it may be difficult to detect a start of a linking area, and the adoption of the pair of FS0 and FS7 may not be ideal.

Using only FS7 is shown in FIG. 7b. As shown in the case (1) of FIG. 7b, the frame sync sequence before the frame #0 is FS7/FS2, FS7/FS4 and FS2/FS4 and the frame #0 is the first address unit or the middle unit of RUB. As the case (2) shows, the frame sync sequence before the frame #1 is FS0, FS7/FS2 and FS7/FS4 and the frame #1 is the first or the middle unit of RUB. In addition, as the case (3) shows, the frame sync sequence before the frame #2 is FS1, FS0 and FS2 and the frame #2 is also the first or the middle unit of RUB.

However, as depicted in the 'B'-marked case of FIG. 7b, the first linking frame (frame #31) and the second linking frame (frame #32), which are in accordance with exemplary embodiments of the present invention, have the same frame sync sequence at frames N and N−3, which could cause a problem in defining a linking area. However, because the two linking frames have the newly-defined frame sync FS7, this case of FS7-FS7 would make it easier to detect a linking area, than the case of FS0-FS7 of FIG. 7a.

FIG. 7c shows the case where FS7 and FS8 are used. As the case (1) shows, the frame sync sequence ahead of the frame #0 is FS8/FS2, FS7/FS4 and FS2/FS4 and the frame #0 is the first or the middle address unit of RUB. As the case (2) shows, the frame sync sequence before the frame #1 is FS0, FS8/FS2 and FS7/FS4 and the frame #1 is the first or the middle unit of RUB.

In addition, as the case (3) shows, the frame sync sequence ahead of the frame #2 is FS1, FS0 and FS7/FS2 and the frame #2 is also the first and the middle unit of RUB.

As shown in FIG. 7c, the use of FS7 and FS8 dose not reveal same previous frame sync sequence before any frame, namely, the previous frame sync sequence before any frame is unique, therefore, there is no problem in detecting a linking area.

Consequently, the use of FS7 and FS8 is a well selected pair for a linking area structured in accordance with exemplary embodiments of the present invention. In addition, the frame syncs FS7 and FS8 satisfy RMTR constraint as explained above. Although in this exemplary embodiment, FS7 and FS8 are selected to identify the linking area and/or satisfy the RMTR constraint, any other combination could also be used, as would be known by one of ordinary skill in the art.

FIG. 8 is a flow diagram of an exemplary embodiment of a method to reproduce a recording medium structured in accordance with exemplary embodiments of the present invention.

If a BD-ROM containing a linking area structured in accordance with exemplary embodiments of the present invention is loaded (S81), management information for reproducing control written in the BD-ROM is read into a memory (S82). If the management information has been written in a lead-in area, it may be read out at an initial preparing stage by an optical pickup. Reproduction of main data is started under control of a controlling unit (S83). During reproduction, a frame sync is detected (S84). If detected, a determination is made whether or not the detected sync is one of the syncs written in the main data area (S85). This determination is possible if a disc recording/reproducing device having syncs FS0~FS8 stored therein compares the detected sync with the stored syncs.

If it is determined that the detected sync is one of syncs (FS0~FS6) written in the main data area (S86), reproduction continues. However, if it is determined that the detected sync does not pertain to one of syncs (FS0~FS6), which means that it is a newly-defined sync FS7 or FS8, a current location is regarded a linking area (S87) and then it is determined whether the area is within the first linking frame or within the second (S88). If within the first linking frame, data following its frame sync is descrambled (S89). Otherwise, the current location is regarded as the second linking frame and data just after its frame sync is descrambled (S90).

Therefore, a disc player, that includes an optical pickup 11, a VDP system 12, and a D/A converter 13 as depicted in FIG. 9, can more accurately detect a physical address and user data within the first and the second linking frame (Recording Frames #k+1, #k+2) of a BD-ROM when it is placed therein. More particularly, if the user data contains useful information for anti-piracy or servo-control, the disc player can conduct an operation to use the useful information.

As explained above, whether a current location, which an optical pickup is on, is within a linking area or main data area can be determined more easily and/or more quickly by detecting and comparing a newly-defined frame sync.

(2) Physical Address

Figure 10A:
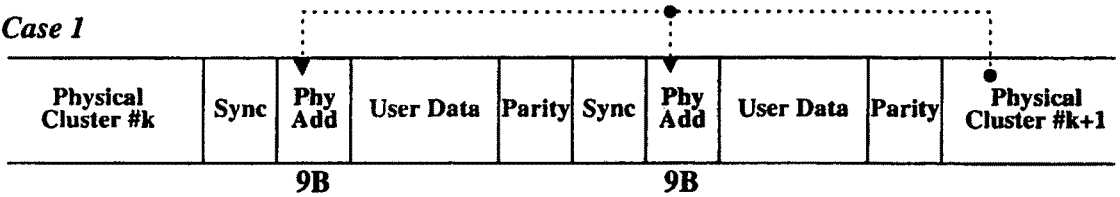
FIGS. 10a to 10c show ways to write a physical address in a linking area in accordance with an exemplary embodiment of the present invention.
Figure 10A:
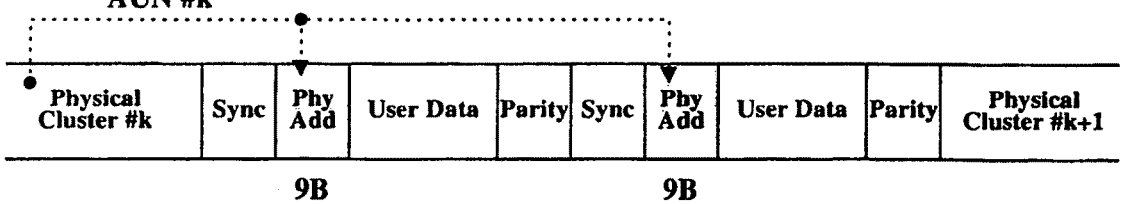
Figure 10A:
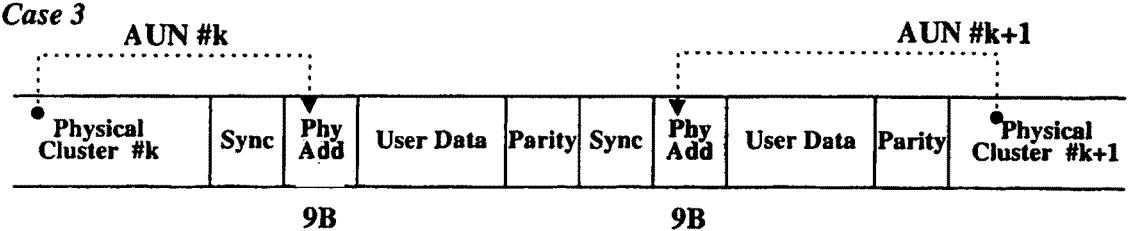

In the linking frame structure shown in FIG. 4a, there are at least three alternatives for writing a physical address in each recording frame of a linking area as shown in FIG. 10a. A first alternative writes in both linking frames an AUN of a physical cluster #k+1 closest behind the frames, and a second alternative writes an AUN of a physical cluster #k closest before the frames.

In the third alternative, an AUN of a physical cluster #k closet before the first linking frame is written in the first while an AUN of a physical cluster #k+1 closest behind the second linking frame is written in the second.

Figure 11A:
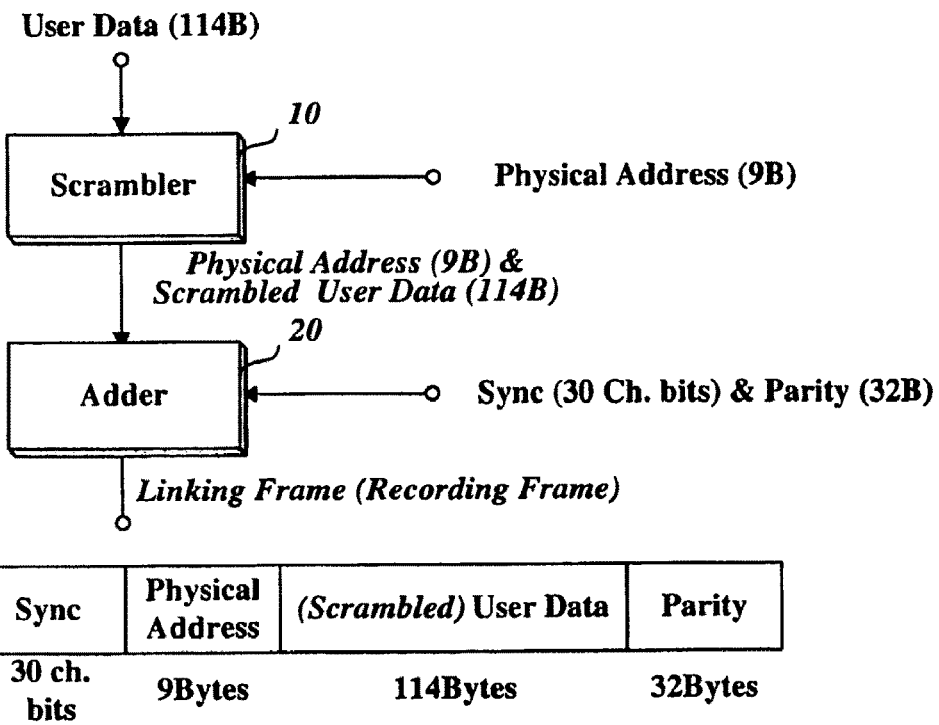

The physical address, composed of 4-byte address, 1-byte reserved and 4-byte parity as shown in FIG. 11a, may be encoded to have error recovery capability by RS(9,5,5) that is used for a BD-RE. The processing to make an address have error recovery capability will be described in more detail below.

A disc player, that includes an optical pickup 11, a VDP system 12, and a D/A converter 13 as depicted in FIG. 9, can more accurately detect a physical address and user data within the first and the second linking frame (Recording Frames #k+1, #k+2) of a BD-ROM when it is placed therein. More particularly, if the user data contains useful information for anti-piracy or servo-control, the disc player can conduct an operation to use the useful information.

Figure 10B:
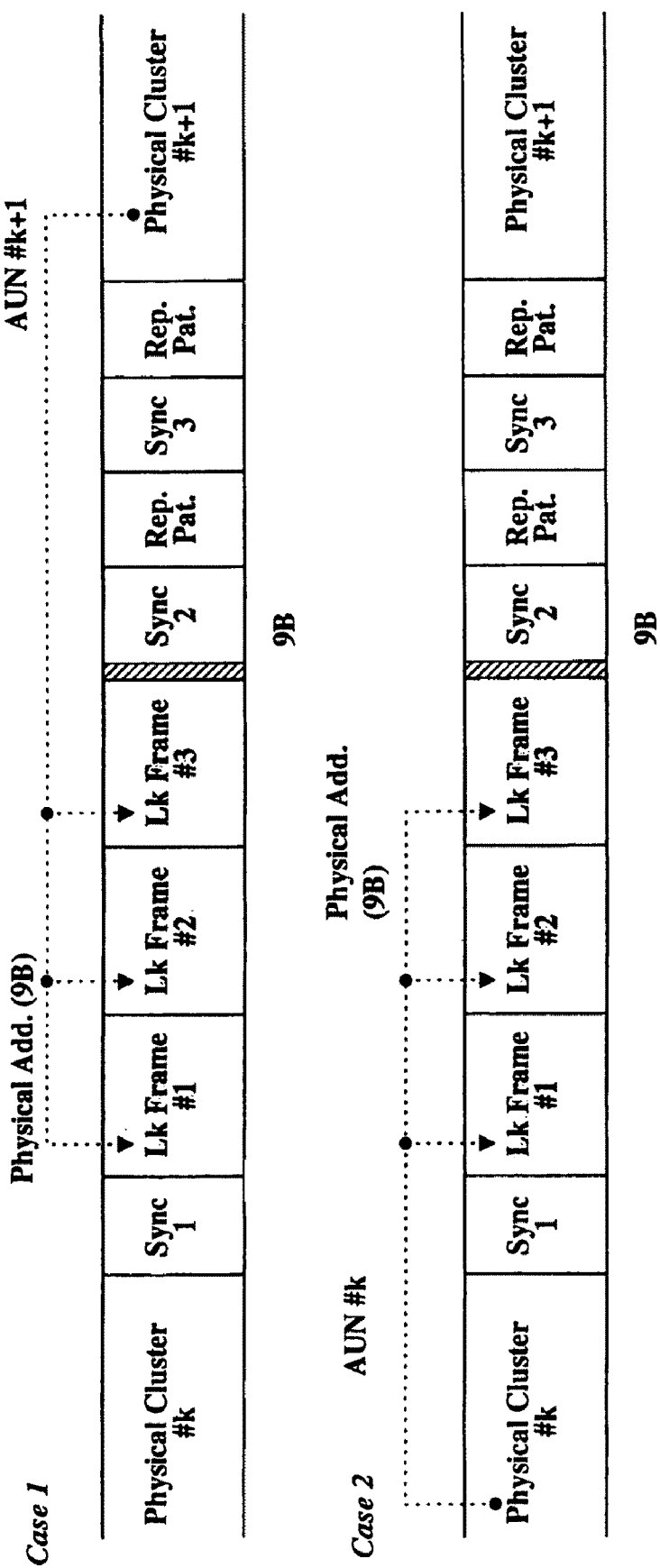

In the linking frame structure shown in FIG. 4d, there are at least two alternatives for writing a physical address in each of three recording frames of a linking area as shown in FIG. 10b. A first alternative writes in three linking frames an AUN of a physical cluster #k+1 closest behind the frames, and a second alternative writes an AUN of a physical cluster #k closest before the frames.

The physical address, composed of 4-byte address, 1-byte reserved and 4-byte parity as shown in FIG. 11a, may be encoded to have error recovery capability by RS(9,5,5) that is used for a BD-RE. The processing to make a physical address have error recovery capability will be described in more detail below.

A disc player, that includes an optical pickup 11, a VDP system 12, and a D/A converter 13 as depicted in FIG. 9, can more accurately detect a physical address and user data within the successive three linking frames (Recording Frames #k+1, #k+2, #k+3) of a BD-ROM when it is placed therein. More particularly, if the user data contains useful information for anti-piracy or servo-control, the disc player can conduct an operation to use the useful information.

Figure 10C:
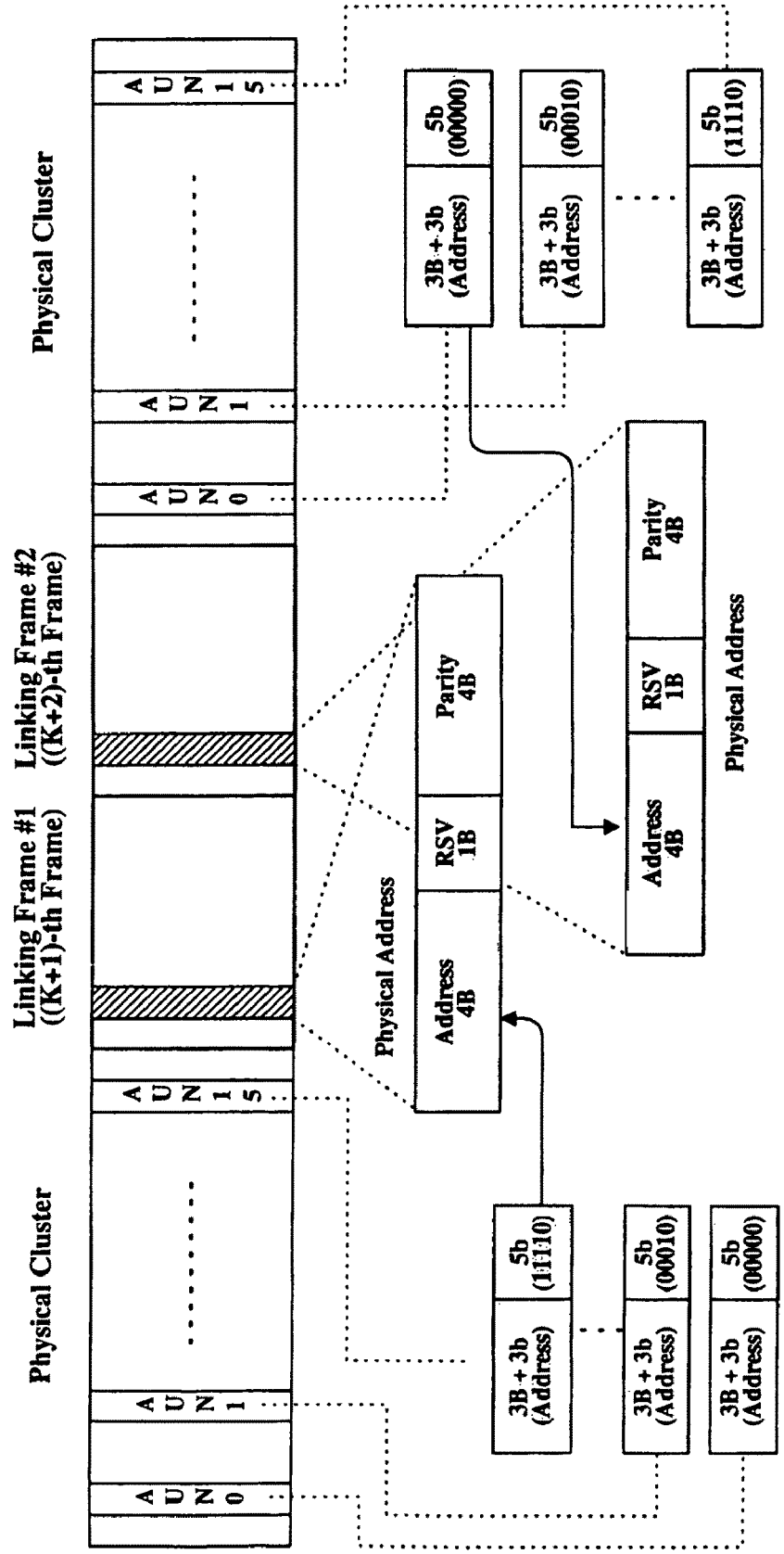

FIG. 10c shows another exemplary embodiment of the present invention that writes an address in a recording frame. Each of the linking frames (Recording Frames #k+1, #k+2) contains a 9-byte physical address where 4-byte actual address is included. The 4-byte actual address may have same value with 16 AUNs #0~#15 written in a physical cluster before or behind the linking frames.

A 4-byte actual address written in a physical cluster before the first linking frame may be composed of a 27-bit address, a 4-bit sequence number (0000~1111) indicative of its order in physical addresses and 1-bit fixed value '0', as shown in FIG. 10c. All of the 27-bit addresses written in the leading physical cluster may have the same value.

Another 4-byte actual address written in a physical cluster behind the second linking frame may be composed of a 27-bit address, a 4-bit sequence number (0000~1111) indicative of its order in physical addresses and 1-bit fixed value '0', as shown in FIG. 10c. All of the 27-bit addresses written in the following physical cluster may have the same value.

As previously mentioned, the 4-byte actual address of the first linking frame includes an address written in the physical address located therebefore. For example, the 4-byte actual address of the first linking frame has the address value of the closest 16-th AUN (AUN #15) of 27-bit and ' 11110', as shown in FIG. 10c. In this case, the last 1-bit '0' of the five bits '11110' to be written in the first linking frame can be replaced with '1' in order to indicate that a physical address is written in a linking area other than a physical cluster.

In addition, the 4-byte actual address of the second linking frame may include an address written in the physical address located thereafter. For example, the 4-byte actual address of the second linking frame has the address value of the closest first AUN (AUN #0) of 27-bit and '00000', as shown in FIG. 10c. In this case, the last 1-bit '0' of the five bits '00000' to be written in the second linking frame can be replaced with '1' in order to indicate that a physical address is written in a linking area other than a physical cluster.

The final five bits of the 4-byte actual address to be written in the first linking frame may be '00000' while the final five bits to be written in the second linking frame may be '11110', although these values are merely exemplary.

In addition, an address written in an arbitrary physical cluster among physical clusters located before or after a linking area can be written in the first and the second linking frame as explained above with reference to FIG. 10c.

(3) Scrambling

FIG. 11a is a block diagram of an exemplary linking frame constructing circuit for the structure shown in FIG. 4a. The linking frame constructing circuitry may comprise a scrambler 10 and an adder 20. The scrambler 10 scrambles 114-byte user data with 9-byte physical address to make its DSV (Digital Sum Value) close to zero and adds the 9-byte physical address before the scrambled user data.

The adder 20 adds 32-byte parity behind the address-added user data from the scrambler 10 as well as a 20-channel-bit frame sync ahead of the address-added user data. Consequently, a complete recording frame including 114-byte user data scrambled with a 9-byte physical address can be constructed.

In the scrambling of user data, information other than a 9-byte physical address can also be used.

Figure 11B:
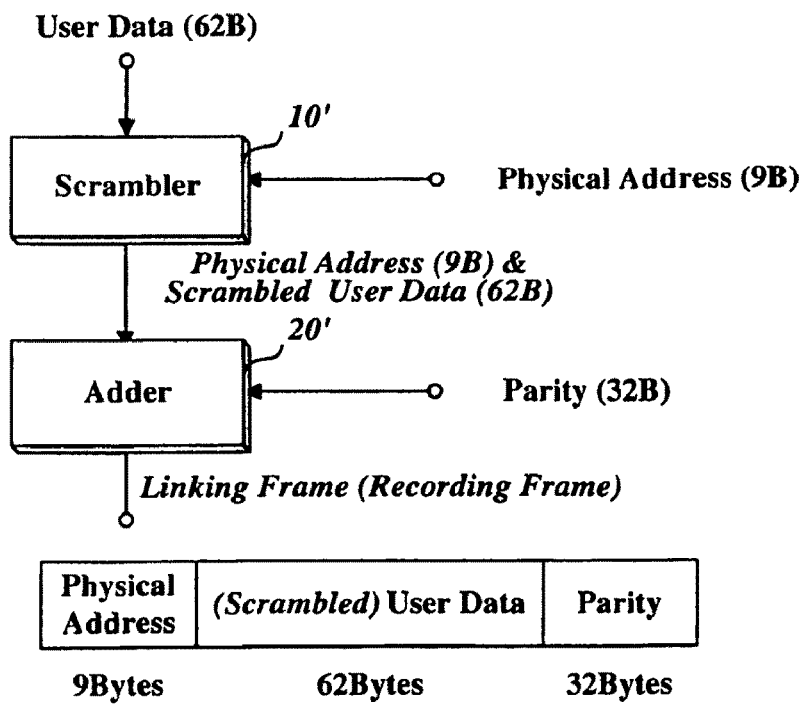
FIG. 11b is a block diagram of an exemplary linking frame constructing circuit to create a linking frame with input user data as shown in FIG. 4d.

FIG. 11b is a block diagram of another exemplary linking frame constructing circuit for the structure shown in FIG. 4d. This linking frame constructing circuitry includes a scrambler 10' and an adder 20'. The scrambler 10' scrambles 62-byte user data such as anti-piracy information with a 9-byte physical address to make its DSV (Digital Sum Value) close to zero and adds the 9-byte physical address before the scrambled user data.

The adder 20' adds 32-byte parity behind the address-added user data from the scrambler 10'. Consequently, a complete 103-byte recording frame including 62-byte user data scrambled with a 9-byte physical address can be constructed.

In the scrambling of user data, information other than a 9-byte physical address can also be used.

Figure 12A:
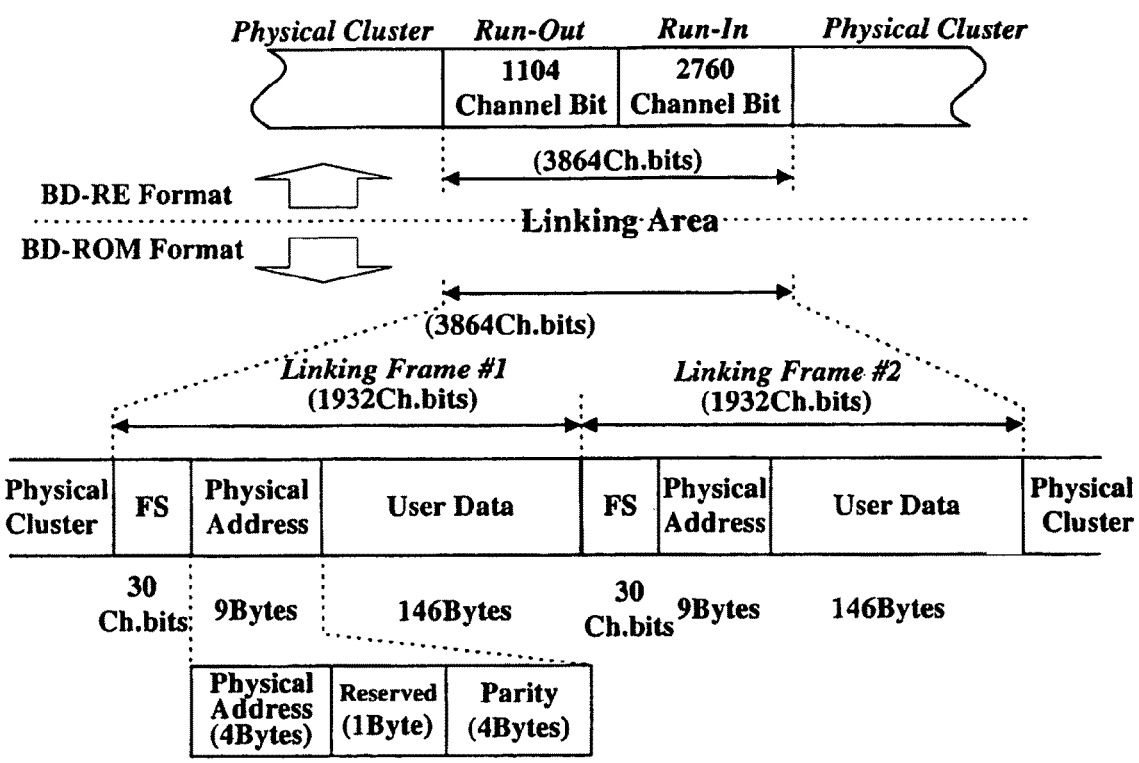
FIG. 12a shows an exemplary physical address allocated in the linking frame shown in FIG. 4b.

Instead of constructing a linking frame including a frame sync, 9-byte physical address, 114-byte user data, and 32-byte parity as shown in FIG. 4a, a linking frame may be constructed to have a frame sync, 9-byte physical address including 1-byte reserved and 4-byte parity, and 146-byte user data as shown in FIG. 4b or 12a. The 146-byte user data may be scrambled and the 4-byte actual physical address may be used as a scrambling key.

Figure 12B:
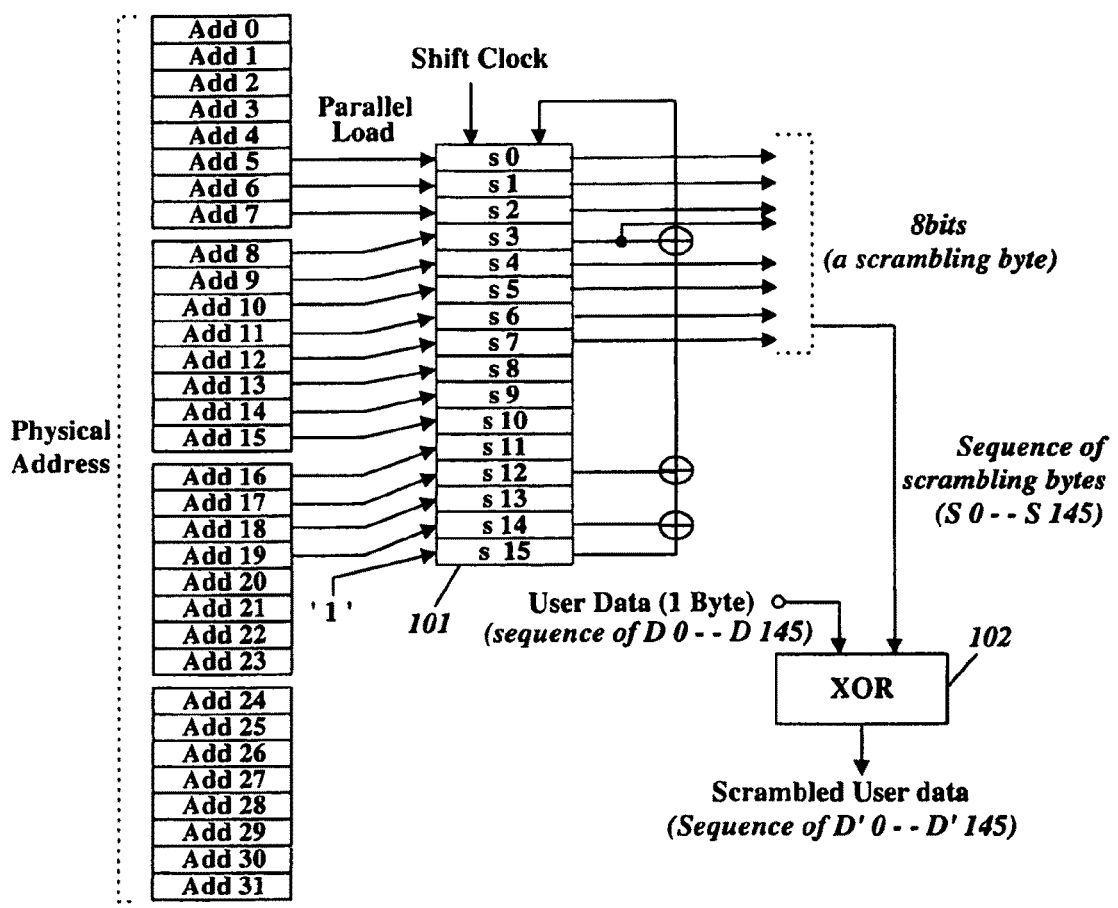

That is, a part of 32 bits (Add 0~Add 31) of the 4-byte physical address may be used as an initial loading value of a 16-bit shift register 101 in the scrambling circuitry, as shown in FIG. 12b. After the initial loading value is loaded in parallel into the shift register 101, one scrambling byte is outputted every bit shift.

Because the user data is 146-byte in length in the exemplary embodiment of FIG. 9, part of physical address is loaded in parallel into the shift register 101 every 146 shifts. The partial address to be loaded changes as a linking area does. After the parallel loading, 146 scrambling bytes (S0~S145) are created and OR-ed exclusively with successive 146 bytes (D0~D145) of user data by an exclusive-OR gate 102, sequentially. The successive 146 bytes scrambled as before are written in a linking frame.

Instead of a physical address, a part of frame sync pattern or some repetitions of bits '10' can be used as a scrambling key to scramble user data. Moreover, instead of a physical address to be written in a linking frame, one address among 16 addresses included in a physical cluster before or behind a current linking frame may also be used, especially, an address closest to a current linking frame can be used among the 16 addresses.

A physical address to be written in a linking frame may be scrambled along with user data written therein.

In another exemplary embodiment of the present invention, a physical address may not be written in a linking frame as shown in FIG. 4c. In this case, a physical address before or behind a linking frame is used as a scrambling key, namely, an initial loading value to the shift register. Because user data is 155 bytes long in this exemplary embodiment, the same or different physical address is loaded as an initial value into the shift register every 155 shifts.

Figure 13:
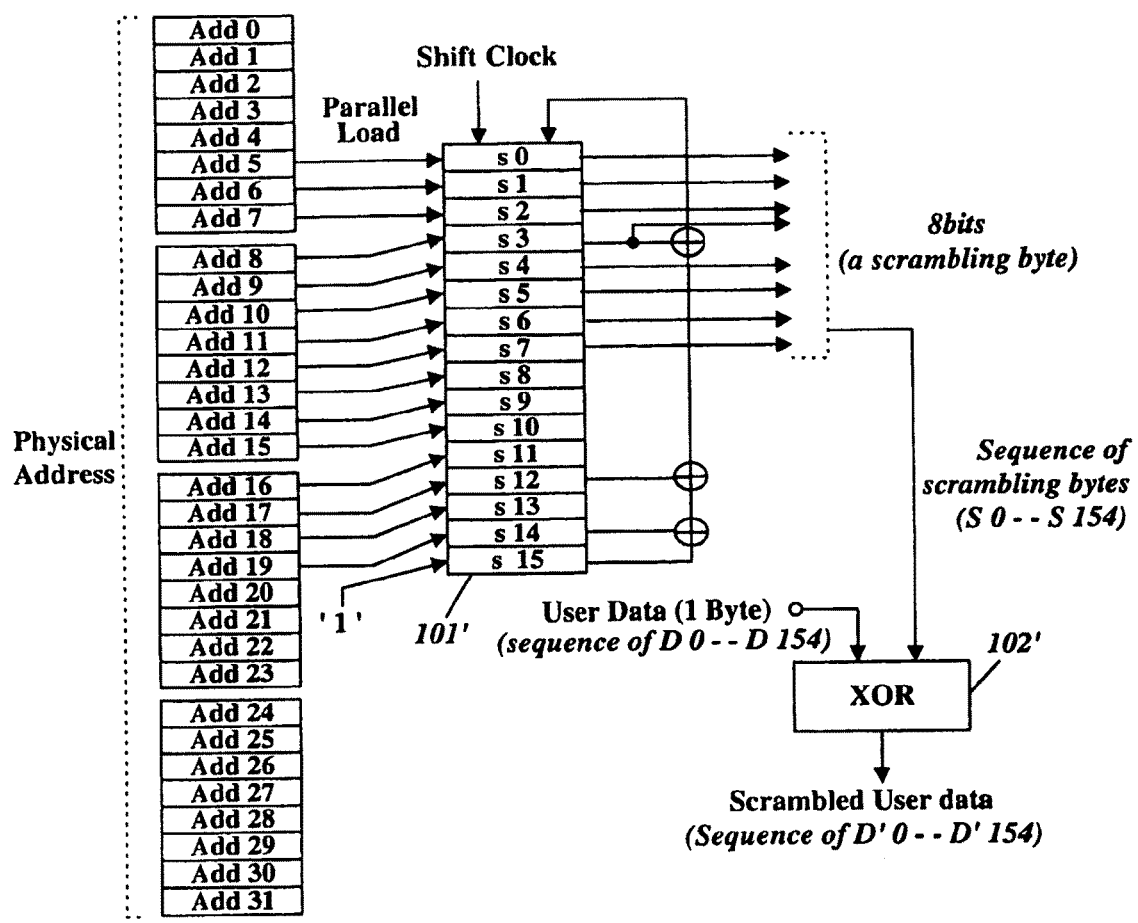
FIG. 13 is an exemplary block diagram of a scrambler to scramble user data into the linking frame shown in FIG. 4c.

As shown in FIG. 13, a part of the 4-byte address (Add #0~#31) is loaded in parallel into a 16-bit shift register 101' of a scrambler that is also applicable to a BD-RE recording and then 155 8-bit scrambling bytes (S0~S154) are outputted sequentially during the process of bit-shifts.

The successive 155 scrambling bytes (S0~S154) can be exclusive-ORed with successive 155 user bytes (D0~D154) by an exclusive-OR gate 102'. As a result, 155 scrambled user data (D'0~D'154) are produced and they are written in a recording frame in a linking area.

Figure 14A:
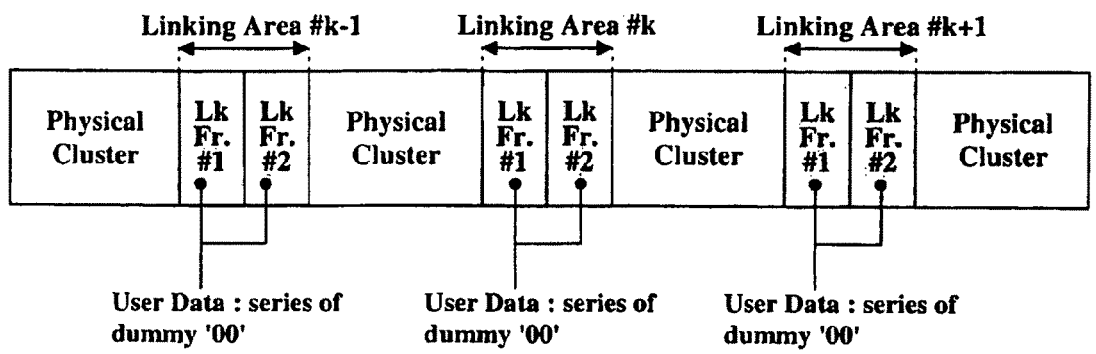
FIGS. 14a to 14c illustrate exemplary user data spaces of linking frames where user data of arbitrary values are written.

Instead of a physical address, a part of frame sync pattern or some repetitions of bits '10' can be used as a scrambling key to scramble user data.
(4) Dummy Data In case that useful data for anti-piracy or servo-control is not written in the user data space, although two recording frames are formed in a linking area of a BD-ROM to ensure reproducing compatibility with a BD-RE, the user data space may be filled with an arbitrary value, e.g., '00h' as shown in FIG. 14a. A series of such a filling value is called dummy data.

Figure 14B:
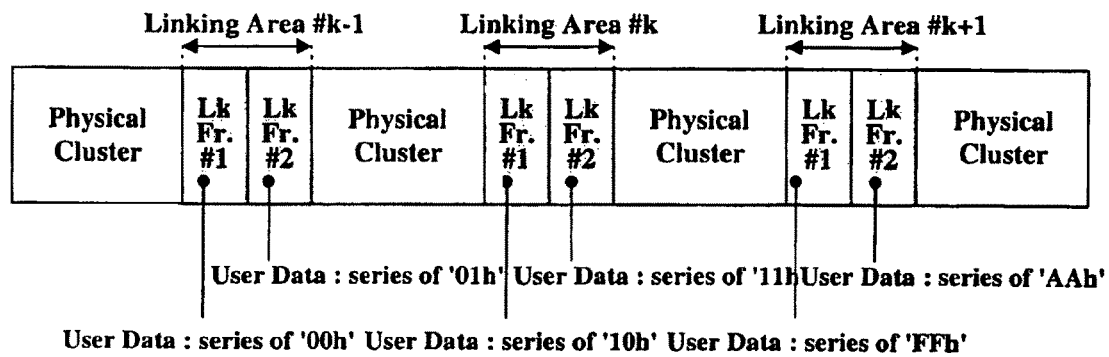

If the same data was filled in the entire user data spaces, the manufacturing process of a BD-ROM could be simplified. Further, if adjacent tracks had the same bit patterns crosstalk could arise. Thus, another exemplary embodiment of dummy data, several values, e.g., '00h', '01h', '10h', '11h', 'FFh', 'AAh', etc. are written in user data spaces in turn, as illustrated in FIG. 14b in order to reduce the probability of crosstalk.

In this exemplary embodiment of dummy data recording, dummy data of different values are recorded in the recording frames of each linking frame allocated in a BD-ROM, which reduces the probability that the same recording patterns are formed between neighboring tracks. Consequently, the crosstalk probability is reduced.

Figure 14C:
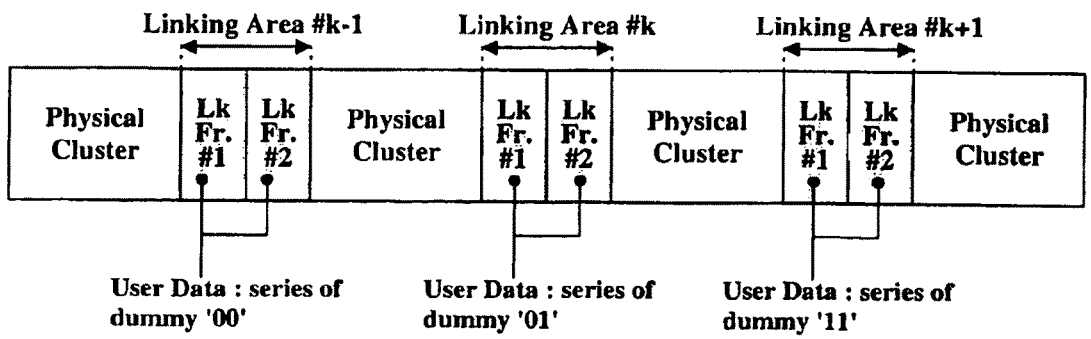

If two recording frames are formed in a linking area of a BD-ROM to ensure reproducing compatibility with a BD-RE, in another exemplary embodiment according to the present invention, the user data space may be filled with several, arbitrary different values, e.g., '00', '01', '11' which appear alternately as shown in FIG. 14c.

In the exemplary dummy data recording embodiment of FIG. 14c, a linking area has the same data in its user data spaces while neighboring linking areas have different dummy data.

In this exemplary embodiment, the probability that the same recording patterns are formed between neighboring tracks is lower, therefore, the crosstalk probability is reduced. The manufacturing process of a BD-ROM of this exemplary embodiment is also simpler.

In addition, if one value, e.g., '00h' fills entire user data spaces after being scrambled with a physical address that changes every linking area, crosstalk can also be reduced.

If '00h' fills the user data spaces after scrambling, if a non-scrambled '08h' is placed at the foremost front of each user data space, any of the aforementioned new frame syncs can be used irrespective of the RMTR constraint specified in 17PP modulation as explained above.
(5) Construction of ECC Block If useful and important information is written in the user data space, this information may be channel-encoded to ensure its reliability. RS(62,30,33) and RS(248,216,33) encoding system are exemplary channel encoding systems that may be used. These encoding systems may also be specified to be used to encode user data to be written in physical clusters of a BD-ROM.

Figure 15A:
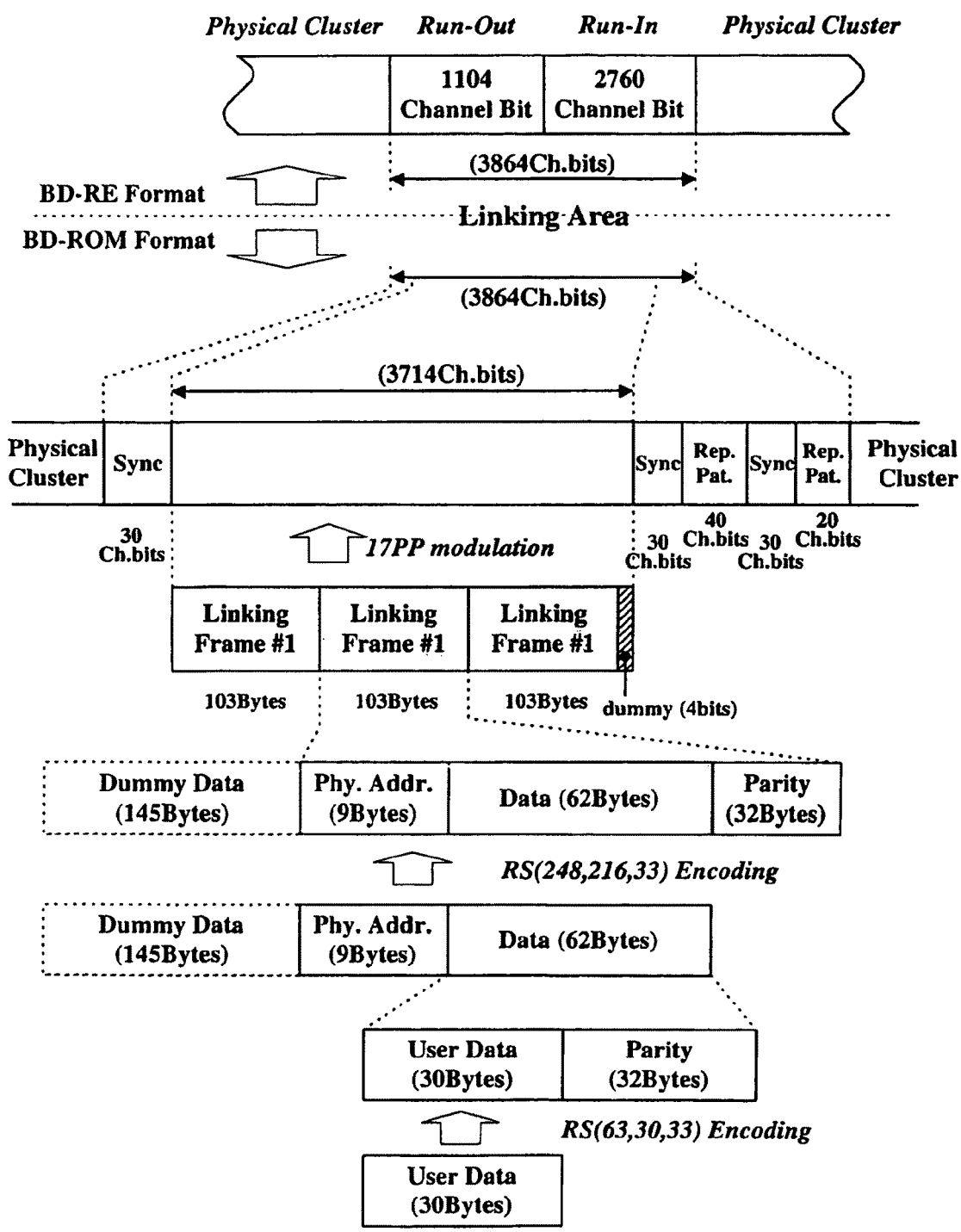
FIG. 15a shows an exemplary of the present invention to write user data in error recoverable format in a user data space of a linking frame shown in FIG. 4d.
Figure 15B:
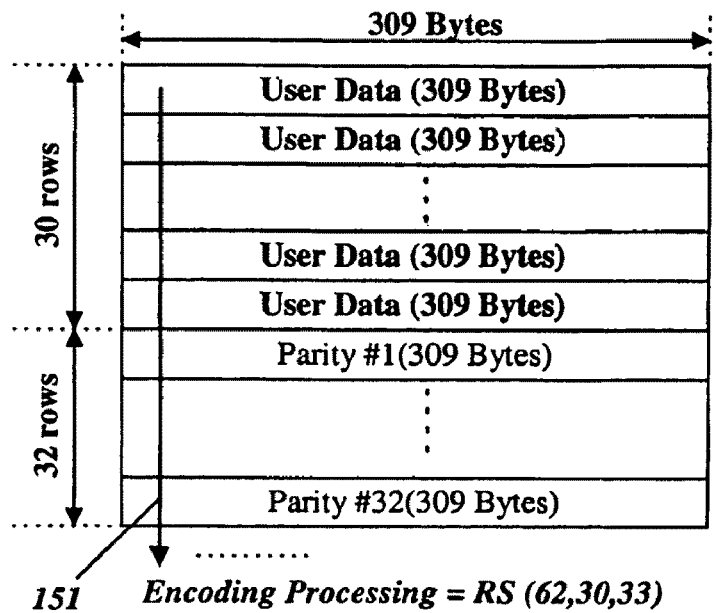

FIG. 15a shows a recording example in which data is recorded in a linking area structured as shown in FIG. 4d. For recording useful data as illustrated in FIG. 15a, 30-byte useful data may be encoded first by RS(62,30,33) system, which creates 32-byte parity.

For this operation, input data may be sequentially stored in a memory to organize a 30×309 data block. When a 30×309 data block is organized, every column is sequentially scanned (151). A 32-byte parity is produced by the RS(62,30,33) encoding system every one scan of the column and it is appended thereto. As a result, a 62-byte data series is constructed.

Each 62 bytes including the parity may be scrambled. In case of scrambling, a part of a physical address may be used as a scrambling key as explained above.

A 9-byte physical address may be added in front of the 62 bytes produced from the above process. The 9-byte physical address may be composed of an actual physical address and parity thereof. For instance, The 9-byte physical address may be composed of a 4-byte actual address, 1-byte reserved, and a 4-byte parity.

145-byte dummy data may be added to the 71 bytes including the physical address and then encoded by RS(248,216,33) system; as a result, 32-byte parity is added. The added 145 dummy bytes may then be removed to produce a 103-byte data unit to be written in a linking area.

The above-explained operations are then repeated for the next 30-byte useful data to produce successive 103-byte data units. After three units are produced, 4 dummy bits may be added behind the three units and the total 2467 bits are then 17PP-modulated. After 17PP-modulation, the 2467 bits can be extended to 3714 channel bits. The first frame sync of 30 channel bits is placed in front of the modulated 3714 bits, and the second 30-channel-bit frame sync, a 40-channel-bit repeated bit pattern, the third 30-channel-bit frame sync, and another 20-channel-bit repeated bit pattern are sequentially appended to the modulated bits. The thusly-made 3864 channel bits may then be written in a linking area.

Figure 15C:
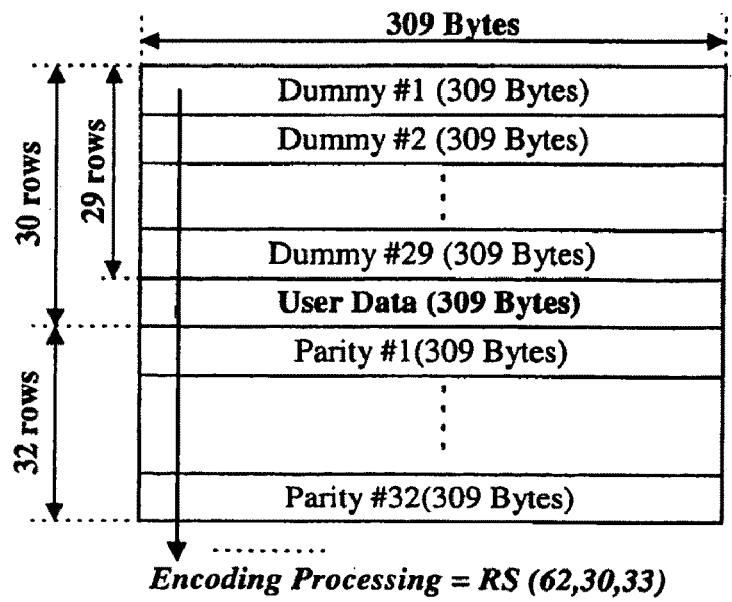

If useful data is large not enough to fill a single linking area as above, dummy data is added to a segment of useful data to constitute 30 bytes. For instance, if 3-byte useful data is to be written per linking area, one byte of the three should constitute a single data unit. Therefore, as shown in FIG. 15c, only one 309-byte row is filled in a 30×309 data block and other 29 rows are all filled with dummy data. This means that 29-byte dummy data is added to 1-byte useful data at every column. Afterwards, the RS(62,30,33) encoding system is applied to each column of the dummy-added 30 bytes to append 32-byte parity thereto.

In order to restore useful data written in a linking area as before, a decoding process, namely, a reverse sequence of the above-explained writing process, is conducted.

Figure 16:
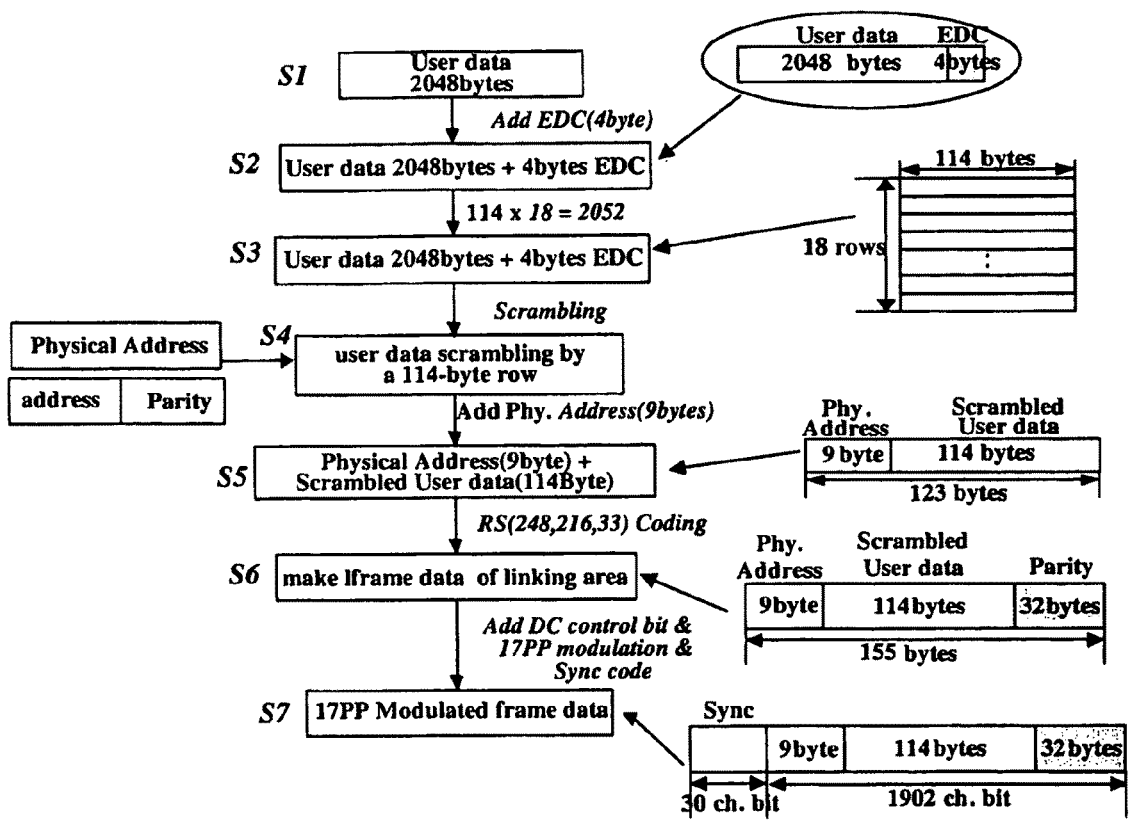
FIG. 16 shows another way to write user data in error recoverable format in a user data space of a linking frame according to an exemplary embodiment of the present invention.

If two same frames constitute a single linking area as illustrated in FIG. 4b, the user data space of a linking frame may be filled with 114-byte useful data and 32-byte parity as shown in FIG. 4a. In the recording example of FIG. 4a, an alternate method from the described in FIG. 4b or 4c can be used in channel encoding to ensure data reliability. The alternate method is explained with reference to FIG. 16.

Useful data is collected up to 2048 bytes (S1). 4-byte EDC (Error Detection Code) is appended to a useful data block composed of the collected 2048 bytes (S2). The 2052 bytes including EDC is divided into eighteen 114-byte data units (S3). The first data unit is scrambled (S4) and a 9-byte physical address is added therebefore (S5). The 93-byte dummy data is added to the 123-byte data unit including the physical address and is encoded by the RS(248,216,33) system, whereby 32-byte parity is appended to the data unit. The added 93 bytes are removed to produce 155-byte frame data (S6) which is then 17PP-modulated. Finally, the aforementioned 30-channel-bit frame sync is added in front of the frame data to make a complete linking frame of 1932 channel bits (S7).

The above-explained sequential processes (S4-S7) are applied to the next divided 114-byte data unit to make another linking frame. The thusly-made two linking frames are written in a linking area; as a result, the structure illustrated in FIG. 4a is formed.

When each 114-byte data unit is scrambled by the above processes, a physical address is used in scrambling as explained above. Same or different physical address, which are written in a RUB located before or behind a linking area, are used for the first and the second linking frame of a linking area. If using different addresses, the first linking frame uses an address written before a linking frame while the second uses another address behind the linking frame.

The physical address to be written in each linking frame may be composed of 4-byte actual address, 1-byte reserved, and 4-byte parity as mentioned above. In this case, the 4-byte parity is produced by applying the RS(9,5,5) channel coding system to the 5 bytes.

In addition, the 4-byte actual address is composed of 27-bit address and 5-bit address identifier that is used to distinguish individual physical addresses in linking areas.

A pair of '00000/11110' or '00001/11111' may be used as address identifier. In case of using the former (or the latter), '00000' (or '00001') is inserted in a physical address in one linking frame while '11110' (or '11111') is inserted in the other linking frame.

In the above explanation of the exemplary embodiments of the present invention, it was described that the new frame sync 'FS n', which is different from the syncs 'FS0~FS6' for data frames written in physical clusters, can be used for linking frames. In case of using the new frame sync different from syncs of data frames, data to be written in physical clusters is encrypted with the frame sync in a linking frame in order that digital contents recorded on a BD-ROM can be protected against illegal copying.

Although contents with such encrypted data recorded on a BD-ROM are copied onto a rewritable disc, e.g., a BD-RE, the new frame sync 'FS n' in a linking frame need not be copied onto a BD-RE and it need not be created during a BD-RE recording. That is, a key having been used in encryption is not obtainable during reproduction of copied contents on a BD-RE, so that it is impossible to decrypt. Consequently, contents on a BD-ROM can be protected against illegal copying.

The above-explained exemplary structures of a linking area of a high-density read-only recording medium according to the present invention helps ensures reproduction compatibility with a rewritable recording medium such as a BD-RE when being reproduced by a disc player or a disc drive. In addition, the exemplary structures of a linking area makes it possible for a disc player or a disc drive to conduct operations to distinguish a read-only recording medium from a rewritable one quickly, if needed. Moreover, useful information can be reliably stored in a linking area through the above-explained exemplary recording techniques.

Although exemplary embodiments of the present invention have been described in conjunction with a high-density, read-only recording medium, the teachings of the present invention are also applicable to other recording media, such as recordable, rewritable, or rewritable once media and methods and apparatuses associated therewith, as would be known to one of ordinary skill in the art.

Although certain specific embodiments of the present invention have been disclosed, it is noted that the present invention may be embodied in other forms without departing from the spirit or essential characteristics thereof. The present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. A read-only recording medium, comprising:
a data area including at least two data sections; and
a linking area to link neighboring data sections, the linking area including two linking frames of the same size, each linking frame including a frame sync in the head position followed by fixed data which is non-scrambled, and including scrambled data produced by scrambling data with address information associated with a preceding data section.

2. The recording medium of clam 1, wherein each frame sync consists of 30 channel bits and each linking frame consists of 1932 channel bits.

3. The recording medium of claim 2, wherein the linking area has same size with a linking area of a recordable recording medium.

4. The recording medium of claim 3, wherein the frame sync included in the linking area is different from a frame sync of linking area written on a recordable recording medium during recording data.

5. The recording medium of claim 4, wherein two frame syncs included in the two linking frames are different from each other.

6. The recording medium of claim 5, wherein the frame sync included in the linking frame is different from a frame sync included in the data area.

7. The recording medium of claim 6, wherein values of the at least two frame syncs maintain uniqueness.

8. The recording medium of claim 7, wherein the frame sync corresponds to a frame sync number comprising a frame sync ID.

9. The recording medium of claim 8, wherein the frame sync, corresponding to a frame sync number of FS7 comprising a frame sync ID of 100 101, is included in one of the two linking frames.

10. The recording medium of claim 9, wherein the frame sync, corresponding to a frame sync number of FS8 comprising a frame sync ID of 101 010, is included in one of the two linking frames.

11. The recording medium of claim 2, wherein the recording medium further comprises a lead-in area including management information used for controlling a reproduction of data recorded on the data area.

12. The recording medium of claim 2, wherein a frame in one of the data area and the linking area is identifiable based on a combination of a frame sync of the frame and a frame sync of a preceding frame.

13. The recording medium of claim 1, wherein a value of the fixed data is '08h'.

14. An apparatus for reproducing data from a read-only recording medium, comprising:
    an optical pickup configured to reproduce data recorded on a data area of the read-only recording medium, the data area including at least two data sections; and
    a controller configured to control the optical pickup to identify a linking area included in the read-only recording medium, the linking area linking neighboring data sections and including two linking frames of the same size, each linking frame including a frame sync in the head position followed by fixed data which is non-scrambled, and including scrambled data,
    wherein the scrambled data was scrambled with address information associated with a preceding data section.

15. The apparatus of claim 14, wherein the controller is configured to determine whether a current area read by the optical pickup is the linking area based on the frame sync, wherein the frame sync included in the linking area is different from a frame sync of a linking area written on a recordable recording medium during recording data and different from a frame sync included in the data area, and a frame sync included in a first linking frame is different from a frame sync included in a second linking frame.

16. The apparatus of claim 15, wherein the optical pickup is configured to read the frame sync corresponding to a frame sync number comprising a frame sync ID, wherein a frame sync corresponding to a frame sync number of FS7 comprising a sync ID of 100 101 is located in the first linking frame and a frame sync corresponding to a frame sync number of FS8 comprising a frame sync ID of 101 010 is located in the second linking frame.

17. The apparatus of claim 15, wherein the controller is configured to control a reproduction according to the result of the determination such that the data within the neighboring data sections of the data area is reproduced continuously if the controller determines the current area is not the linking area, and the data within the neighboring data sections of the data area is reproduced excluding the scrambled data if the controller determines the current area is the linking area.

18. The apparatus of claim 14, wherein the controller is configured to control a reproduction of the data read by the optical pickup by using management information included in a lead-in area of the recording medium.

19. The apparatus of claim 14, wherein the controller is configured to control the optical pickup to identify a frame in one of the data area and the linking area based on a combination of a frame sync of the frame and a frame sync of a preceding frame.

20. A method for reproducing data from a read-only recording medium, comprising:
    identifying a linking area included in the recording medium, the linking area linking neighboring data sections included in a data area of the recording medium and including two linking frames of the same size, each linking frame including a frame sync in the head position followed by fixed data which is non-scrambled and including scrambled data,
    wherein the scrambled data was scrambled with address information associated with a preceding data section.

21. The method of claim 20, further comprising:
    determining whether a currently read area is the linking area based on the frame sync, wherein the frame sync included in the linking area is different from a frame sync of a linking area written on a recordable recording medium during recording data and different from a frame sync included in the data area, and a frame sync included in a first linking frame is different from a frame sync included in a second linking frame; and
    reproducing data recorded on the data area of the recording medium according to the result of the determining step.

22. The method of claim 21, further comprising:
    descrambling the scrambled data with the address information associated with a preceding data section.

23. The method of claim 21, wherein the reproducing step reproduces the data continuously if it is determined that the currently read area is not the linking area, and reproduces the data excluding the scrambled data if it is determined that the currently read area is the linking area.

24. The method of claim 20, further comprising:
    reading management information from a lead-in area of the recording medium to control a reproduction of the data recorded on the data area.

25. The method of claim 20, wherein the identifying step identifies a frame in one of the data area and the linking area based on a combination of a frame sync of the frame and a frame sync of a preceding frame.

26. An apparatus for recording data on a recording medium, comprising:
    an optical pickup configured to record data on the recording medium, wherein the recording medium comprises a data area including at least two data sections and a linking area linking neighboring data sections;

a scrambler circuit configured to scramble data with address information associated with a preceding data section; and a controller configured to control the optical pickup to record the linking area, the linking area including two linking frames of the same size, each linking frame including a frame sync in the head position followed by fixed data which is non-scrambled and including the scrambled data.

27. An apparatus for manufacturing a recording medium, comprising:

an optical pickup configured to record data on the recording medium, wherein a data area including at least two data sections and a linking area including at least two linking frames of the same size and linking neighboring data sections are formed during recording the data;

a scrambler circuit configured to scramble data with address information associated with a preceding data section; and a controller configured to control the optical pickup to record a frame sync in the head position of each linking frame, non-scrambled fixed data following the frame sync and the scrambled data during recording the data.

* * * * *